US012370394B2

(12) United States Patent
Linsmeier et al.

(10) Patent No.: US 12,370,394 B2
(45) Date of Patent: Jul. 29, 2025

(54) REPOSITIONABLE CONSOLE

(71) Applicant: Oshkosh Corporation, Oshkosh, WI (US)

(72) Inventors: Eric R. Linsmeier, Larsen, WI (US); Russ Litscher, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1048 days.

(21) Appl. No.: 17/377,768

(22) Filed: Jul. 16, 2021

(65) Prior Publication Data

US 2021/0339065 A1 Nov. 4, 2021

Related U.S. Application Data

(63) Continuation of application No. 16/846,972, filed on Apr. 13, 2020, now Pat. No. 11,065,488, which is a continuation of application No. 16/389,630, filed on Apr. 19, 2019, now Pat. No. 10,617,900.

(60) Provisional application No. 62/661,382, filed on Apr. 23, 2018.

(51) Int. Cl.

| | |
|---|---|
| ***A62C 37/00*** | (2006.01) |
| ***A62B 1/02*** | (2006.01) |
| ***A62C 27/00*** | (2006.01) |
| ***B66F 11/04*** | (2006.01) |
| ***E06C 5/04*** | (2006.01) |

(52) U.S. Cl.
CPC ................ *A62C 37/00* (2013.01); *A62B 1/02* (2013.01); *A62C 27/00* (2013.01); *B66F 11/046* (2013.01); *E06C 5/04* (2013.01)

(58) Field of Classification Search
CPC ........... A62C 37/00; A62C 27/00; A62B 1/02; B66F 11/046; E06C 5/04
USPC ........................................................ 182/64.1
See application file for complete search history.

(56) References Cited

U.S. PATENT DOCUMENTS

| | | | |
|---|---|---|---|
| 1,667,850 | A | 5/1928 | Gibson |
| 4,667,850 | A | 5/1987 | Scholl et al. |
| 5,890,562 | A | 4/1999 | Bartels et al. |
| 6,755,258 | B1 | 6/2004 | Hunke et al. |
| 6,882,917 | B2 | 4/2005 | Pillar et al. |

(Continued)

FOREIGN PATENT DOCUMENTS

| | | |
|---|---|---|
| JP | 2013-188248 | 9/2013 |
| WO | WO-2016/131488 | 8/2016 |

*Primary Examiner* — Anita M King
(74) *Attorney, Agent, or Firm* — Foley & Lardner LLP

(57) ABSTRACT

A vehicle includes a chassis, tractive assemblies, a body assembly, a turntable, a platform, and a control console. The tractive assemblies, body assembly, and turntable are coupled to the chassis. The platform supports an operator in a command position and includes an outer perimeter. The control console includes a base coupled to the turntable and spaced from the outer perimeter. The control console includes a movable section that is movably coupled to the base and includes an operator interface configured to receive operator commands to control a vehicle system. The movable section is repositionable relative to the base between a stowed position and an operating position. The operator interface is accessible by the operator from the command position when the movable section is in the operating position. The vehicle has an overall height defining a top plane. The movable section is below the top plane when in the stowed position.

20 Claims, 32 Drawing Sheets

(56) References Cited

U.S. PATENT DOCUMENTS

| | | | | |
|---|---|---|---|---|
| 7,389,826 | B2 | 6/2008 | Linsmeier et al. | |
| 9,302,129 | B1 | 4/2016 | Betz et al. | |
| 10,617,900 | B1 * | 4/2020 | Linsmeier | B66F 11/046 |
| 11,065,488 | B2 * | 7/2021 | Linsmeier | B66F 11/046 |
| 11,161,483 | B2 * | 11/2021 | Betz | B66F 17/006 |
| 11,679,966 | B2 * | 6/2023 | Rosencrance | B66F 11/042 187/211 |
| 11,795,043 | B2 * | 10/2023 | Betz | A62C 27/00 |
| 11,850,456 | B2 * | 12/2023 | Betz | A62C 27/00 |
| 2004/0178018 | A1 | 9/2004 | Christenson | |
| 2004/0199302 | A1 | 10/2004 | Pillar et al. | |
| 2005/0234622 | A1 | 10/2005 | Pillar et al. | |
| 2008/0114513 | A1 | 5/2008 | Pillar et al. | |
| 2009/0033044 | A1 | 2/2009 | Linsmeier | |
| 2014/0251726 | A1 | 9/2014 | Ditty et al. | |
| 2014/0262355 | A1 | 9/2014 | Linsmeier | |
| 2015/0259185 | A1 | 9/2015 | Ditty | |
| 2016/0311253 | A1 | 10/2016 | Palmer et al. | |
| 2018/0038517 | A1 | 2/2018 | Ditty et al. | |
| 2018/0215354 | A1 | 8/2018 | Linsmeier et al. | |
| 2018/0215597 | A1 | 8/2018 | Linsmeier et al. | |
| 2018/0289999 | A1 | 10/2018 | Kay et al. | |
| 2018/0293818 | A1 | 10/2018 | Linsmeier et al. | |
| 2018/0297597 | A1 | 10/2018 | Linsmeier et al. | |
| 2019/0119088 | A1 | 4/2019 | Puszkiewicz et al. | |
| 2019/0137006 | A1 | 5/2019 | Ditty et al. | |
| 2020/0238115 | A1 * | 7/2020 | Linsmeier | A62C 37/00 |

* cited by examiner

REPOSITIONABLE CONSOLE

CROSS-REFERENCE TO RELATED PATENT APPLICATIONS

This application is a continuation of U.S. patent application Ser. No. 16/846,972, filed on Apr. 13, 2020, which is a continuation of U.S. patent application Ser. No. 16/389,630, filed Apr. 19, 2019, which (a) claims the benefit of U.S. Provisional Patent Application No. 62/661,382, filed Apr. 23, 2018, and (b) is related to (i) U.S. patent application Ser. No. 16/389,653, filed Apr. 19, 2019, which claims the benefit of U.S. Provisional Patent Application No. 62/661,420, filed Apr. 23, 2018, (ii) U.S. patent application Ser. No. 16/389,570, filed Apr. 19, 2019, which claims the benefit of U.S. Provisional Patent Application No. 62/661,384, filed Apr. 23, 2018, (iii) U.S. patent application Ser. No. 16/389,600, filed Apr. 19, 2019, which claims the benefit of U.S. Provisional Patent Application No. 62/661,414, filed Apr. 23, 2018, (iv) U.S. patent application Ser. No. 16/389,143, filed Apr. 19, 2019, which claims the benefit of U.S. Provisional Patent Application No. 62/661,419, filed Apr. 23, 2018, (v) U.S. patent application Ser. No. 16/389,176, filed Apr. 19, 2019, which claims the benefit of U.S. Provisional Patent Application No. 62/661,426, filed Apr. 23, 2018, (vi) U.S. patent application Ser. No. 16/389,029, filed Apr. 19, 2019, which claims the benefit of U.S. Provisional Patent Application No. 62/661,335, filed Apr. 23, 2018, and U.S. Provisional Patent Application No. 62/829,922, filed Apr. 5, 2019, and (vii) U.S. patent application Ser. No. 16/389,072, filed Apr. 19, 2019, which claims the benefit of U.S. Provisional Patent Application No. 62/661,330, filed Apr. 23, 2018, all of which are incorporated herein by reference in their entireties.

BACKGROUND

Fire apparatuses commonly include aerial assemblies that facilitate accessing elevated or distant areas from the ground. Aerial assemblies typically include ladder assemblies having multiple telescoping ladder sections that may be extended and retracted relative to one another to increase or decrease an overall length of the ladder assembly. Ladder assemblies are typically pivotably coupled to a turntable using an actuator that facilitates raising or lowering the ladder assembly. The turntable is rotatably coupled to a chassis of the fire apparatus, facilitating rotation of the ladder assembly about a vertical axis. Through each of these actuation mechanisms, the end of the ladder assembly can be manipulated throughout a large working area to reach various points of interest (e.g., an individual drowning in a river, a window of a burning building, etc.).

To facilitate control of the aerial assembly, fire apparatuses conventionally include a control console fixed to the turntable. The turntable includes a platform on which operators can stand while using the console. The platform may also facilitate access to the ladder assembly. Multiple factors impact the placement of the control console relative to the platform. In order to maximize operator comfort when using the control console, it is desirable to position the control console at a certain height (e.g., at waist height). However, the overall height of the fire apparatus when traveling is limited by governmental regulations and the vertical clearance of certain areas (e.g., garage doors, bridges, etc.). Due to the proximity of the platform to the top of the fire apparatus, the height of the control console is limited to prevent increasing the overall height of the vehicle. Accordingly, operator comfort may be sacrificed in order to maintain the height requirements of the fire apparatus. Additionally, the control console requires valuable floor space on the platform which could otherwise be occupied by operators, equipment, or a portion of the ladder assembly.

SUMMARY

One embodiment of the present disclosure relates to a vehicle. The vehicle includes a chassis, a plurality of tractive assemblies, a body assembly, a turntable, a platform, and a control console. The plurality of tractive assemblies are coupled to the chassis. Likewise, the body assembly is coupled to the chassis. The turntable is rotatably coupled to the chassis. The platform is configured to support an operator in a command position. Furthermore, the platform includes an outer perimeter. The control console includes a base section and a movable section. The base section of the control console is coupled to the turntable and is spaced form the outer perimeter of the platform. The movable section of the control console is movably coupled to the base. The movable section further includes an operator interface that is configured to receive commands from the operator to control one or more systems of the vehicle. Furthermore, the movable section of the control console is selectively repositionable relative to the base section between a stowed position and an operating position. The operator interface is configured to be accessible by the operator from the command position when the movable section is in the operating position. The vehicle has an overall height defining a top plane. The movable section of the control console is further configured to be below the top plane when in the stowed position.

Another embodiment relates to a fire apparatus. The fire apparatus includes a chassis, a plurality of axles coupled to the chassis, an aerial assembly, and a control console. The aerial assembly includes a turntable, an aerial ladder assembly, and a platform. The turntable is rotatably coupled to the chassis. The aerial ladder assembly is rotatably coupled to the turntable and has a distal end which is opposite the turntable. The platform is coupled to the turntable and supports an operator in a command position. The platform further includes an outer perimeter. The control console includes a base section and an interface section. The base section is coupled to the turntable and spaced from the outer perimeter. The interface section is movably coupled to the base and is selectively repositionable between a stowed position and an operating position. The interface section is further configured to receive commands to control rotation of the aerial ladder assembly and the turntable. The interface section is configured to be accessible by the operator from the command position when the interface section is in the operating position. The fire apparatus has an overall height defining a top plane, and the interface section of the control console is configured to be below the top plane when in the stowed position.

Yet another embodiment of the present disclosure relates to an aerial assembly for a fire apparatus. The aerial assembly for a fire apparatus includes a turntable, a platform, an aerial ladder assembly, and a control console. The turntable is configured to be rotatably coupled to a chassis of the fire apparatus. The platform is coupled to the turntable and supports an operator in a command position. The platform further includes a top surface and an outer perimeter. The aerial ladder assembly is pivotably coupled to the turntable. The control console includes a base section and a movable section. The base section is coupled to the turntable and is spaced from the outer perimeter of the platform. The movable section is movably coupled to the base section and includes an operator interface configured to receive commands from the operator. The movable section is selectively repositionable relative to the base section between a stowed position and an operating position. The operator interface is configured to be accessible by the operator from the command position when the movable section is in the operating position. The aerial assembly includes a top plane, wherein the movable section of the control console is further configured to be below the top plane when in the stowed position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
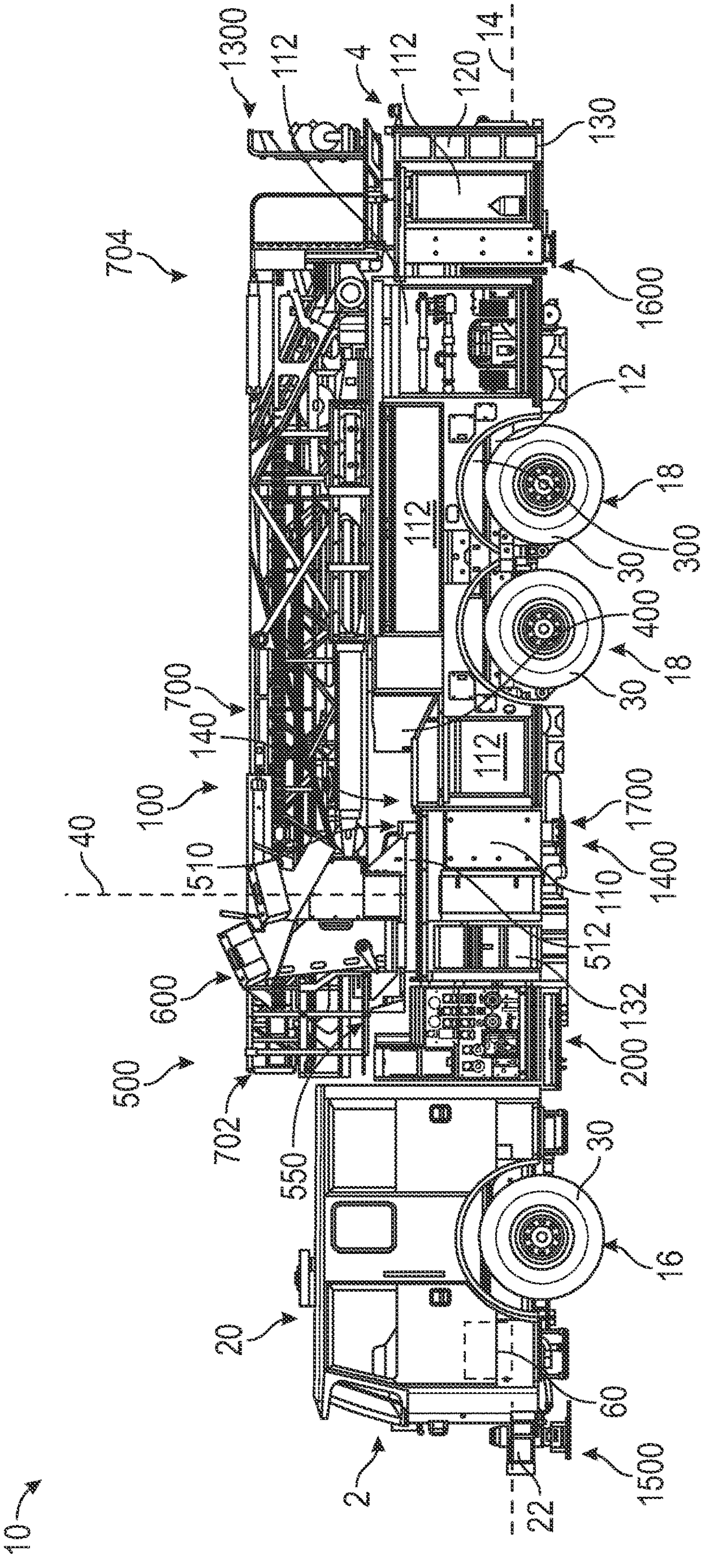
FIG. 1 is a left side view of a mid-mount fire apparatus, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes various components that improve performance relative to traditional systems. In one embodiment, the vehicle is a mid-mount quint configuration fire apparatus that includes a water tank, an aerial ladder, hose storage, ground ladder storage, and a water pump. The aerial ladder is coupled to the chassis between a front axle assembly and a rear axle assembly of the fire apparatus and rotatable about an axis. The water pump is positioned forward of the axis. The aerial ladder is extensible to provide a horizontal reach of at least 88 feet (e.g., 93 feet, etc.) and/or or a vertical reach of at least 95 feet (e.g., 100 feet, etc.). The aerial ladder has a tip load rating of more than 1,000 pounds (e.g., 1,250 pounds, etc.) when the aerial ladder is fully extended (e.g., without a basket coupled to a distal end thereof, etc.). The rear axle assembly may be a tandem rear axle having a gross axle weight rating of no more than 48,000 pounds. The fire apparatus has an overall length (e.g., when viewed from the side, etc.) with (i) a first portion extending from the rear end of the body assembly to a middle of the rear axle and (ii) a second portion extending from the middle of the rear axle to the front end of the front cabin. The second portion is at least twice the length of first portion. The water tank may have a capacity of up to or more than 300 gallons.

Overall Vehicle

According to the exemplary embodiment shown in FIGS. 1-21, a vehicle, shown as fire apparatus 10, is configured as a mid-mount quint fire truck having a tandem rear axle. A "quint" fire truck as used herein may refer to a fire truck that includes a water tank, an aerial ladder, hose storage, ground ladder storage, and a water pump. In other embodiments, the fire apparatus 10 is configured as a mid-mount quint fire truck having a single rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. In still other embodiments, the fire apparatus 10 is configured as a non-quint mid-mount fire truck having a single rear axle or a tandem rear axle. In yet other embodiments, the fire apparatus 10 is configured as a rear-mount, quint or non-quint, single rear axle or tandem rear axle, fire truck.

As shown in FIGS. 1-7, 10-13, 17, and 18, the fire apparatus 10 includes a chassis, shown as frame 12, having longitudinal frame rails that define an axis, shown as longitudinal axis 14, that extends between a first end, shown as front end 2, and an opposing second end, shown as rear end 4, of the fire apparatus 10; a first axle, shown as front axle 16, coupled to the frame 12; one or more second axles, shown as rear axles 18, coupled to the frame 12; a first assembly, shown as front cabin 20, coupled to and supported by the frame 12 and having a bumper, shown as front bumper 22; a prime mover, shown as engine 60, coupled to and supported by the frame 12; and a second assembly, shown as rear assembly 100, coupled to and supported by the frame 12.

As shown in FIGS. 1-7, 10, and 12, the front axle 16 and the rear axles 18 include tractive assemblies, shown as wheel and tire assemblies 30. As shown in FIGS. 1-4, the front cabin 20 is positioned forward of the rear assembly 100 (e.g., with respect to a forward direction of travel for the fire apparatus 10 along the longitudinal axis 14, etc.). According to an alternative embodiment, the cab assembly may be positioned behind the rear assembly 100 (e.g., with respect to a forward direction of travel for the fire apparatus 10 along the longitudinal axis 14, etc.). The cab assembly may be positioned behind the rear assembly 100 on, by way of example, a rear tiller fire apparatus. In some embodiments, the fire apparatus 10 is a ladder truck with a front portion that includes the front cabin 20 pivotally coupled to a rear portion that includes the rear assembly 100.

According to an exemplary embodiment, the engine 60 receives fuel (e.g., gasoline, diesel, etc.) from a fuel tank and combusts the fuel to generate mechanical energy. A transmission receives the mechanical energy and provides an output to a drive shaft. The rotating drive shaft is received by a differential, which conveys the rotational energy of the drive shaft to a final drive (e.g., the front axle 16, the rear axles 18, the wheel and tire assemblies 30, etc.). The final drive then propels or moves the fire apparatus 10. According to an exemplary embodiment, the engine 60 is a compression-ignition internal combustion engine that utilizes diesel fuel. In alternative embodiments, the engine 60 is another type of prime mover (e.g., a spark-ignition engine, a fuel cell, an electric motor, etc.) that is otherwise powered (e.g., with gasoline, compressed natural gas, propane, hydrogen, electricity, etc.).

As shown in FIGS. 1-7, 10-13, and 17-19, the rear assembly 100 includes a body assembly, shown as body 110, coupled to and supported by the frame 12; a fluid driver, shown as pump system 200, coupled to and supported by the frame 12; a chassis support member, shown as torque box 300, coupled to and supported by the frame 12; a fluid reservoir, shown as water tank 400, coupled to the body 110 and supported by the torque box 300 and/or the frame 12; and an aerial assembly, shown as aerial assembly 500, pivotally coupled to the torque box 300 and supported by the torque box 300 and/or the frame 12. In some embodiments, the rear assembly 100 does not include the water tank 400. In some embodiments, the rear assembly 100 additionally or alternatively includes an agent or foam tank (e.g., that receives and stores a fire suppressing agent, foam, etc.).

As shown in FIGS. 1, 2, and 10-12, the sides of the body 110 define a plurality of compartments, shown as storage compartments 112. The storage compartments 112 may receive and store miscellaneous items and gear used by emergency response personnel (e.g., helmets, axes, oxygen tanks, hoses, medical kits, etc.). As shown in FIGS. 5, 6, and 10-12, the rear end 4 of the body 110 defines a longitudinal storage compartment that extends along the longitudinal axis 14, shown as ground ladder compartment 114. The ground ladder compartment 114 may receive and store one or more ground ladders. As shown in FIGS. 3, 5, and 10-13, a top surface, shown as top platform 122, of the body 110 defines a cavity, shown as hose storage platform 116, and a channel, shown as hose chute 118, extending from the hose storage platform 116 to the rear end 4 of the body 110. The hose storage platform 116 may receive and store one or more hoses (e.g., up to 1000 feet of 5 inch diameter hose, etc.), which may be pulled from the hose storage platform 116 though the hose chute 118.

As shown in FIGS. 1-6 and 10-13, the rear end 4 of the body 110 has notched or clipped corners, shown as chamfered corners 120. In other embodiments, the rear end 4 of the body 110 does not have notched or clipped corners (e.g., the rear end 4 of the body 110 may have square corners, etc.). According to an exemplary embodiment, the chamfered corners 120 provide for increased turning clearance relative to fire apparatuses that have non-notched or non-clipped (e.g., square, etc.) corners. As shown in FIGS. 1-3, 5, 6, and 10-13, the rear assembly 100 includes a first selectively deployable ladder, shown as rear ladder 130, coupled to each of the chamfered corners 120 of the body 110. According to an exemplary embodiment, the rear ladders 130 are hingedly coupled to the chamfered corners 120 and repositionable between a stowed position (see, e.g., FIGS. 1-3, 5, 12, 13, etc.) and a deployed position (see, e.g., FIGS. 6, 10, 11, etc.). The rear ladders 130 may be selectively deployed such that a user may climb the rear ladder 130 to access the top platform 122 of the body 110 and/or one or more components of the aerial assembly 500 (e.g., a work basket, an implement, an aerial ladder assembly, the hose storage platform 116, etc.). In other embodiments, the body 110 has stairs in addition to or in place of the rear ladders 130.

As shown in FIGS. 1, 12, 17, and 18, the rear assembly 100 includes a second selectively deployable ladder, shown as side ladder 132, coupled to a side (e.g., a left side, a right side, a driver's side, a passenger's side, etc.) of the body 110. In some embodiments, the rear assembly 100 includes two side ladders 132, one coupled to each side of the body 110. According to an exemplary embodiment, the side ladder 132 is hingedly coupled to the body 110 and repositionable between a stowed position (see, e.g., FIGS. 1, 2, 17, 18, etc.) and a deployed position. The side ladder 132 may be selectively deployed such that a user may climb the side ladder 132 to access one or more components of the aerial assembly 500 (e.g., a work platform, an aerial ladder assembly, a control console, etc.).

As shown in FIGS. 1, 2, 12 and 13, the body 110 defines a recessed portion, shown as aerial assembly recess 140, positioned (i) rearward of the front cabin 20 and (ii) forward of the water tank 400 and/or the rear axles 18. The aerial assembly recess 140 defines an aperture, shown as pedestal opening 142, rearward of the pump system 200.

According to an exemplary embodiment the water tank 400 is coupled to the frame 12 with a superstructure (e.g., disposed along a top surface of the torque box 300, etc.). As shown in FIGS. 1, 2, 12, and 13, the water tank 400 is positioned below the aerial ladder assembly 700 and forward of the hose storage platform 116. As shown in FIGS. 1, 2, 12 and 13, the water tank 400 is positioned such that the water tank 400 defines a rear wall of the aerial assembly recess 140. In one embodiment, the water tank 400 stores up to 300 gallons of water. In another embodiment, the water tank 400 stores more than or less than 300 gallons of water (e.g., 100, 200, 250, 350, 400, 500, etc. gallons). In other embodiments, fire apparatus 10 additionally or alternatively includes a second reservoir that stores another firefighting agent (e.g., foam, etc.). In still other embodiments, the fire apparatus 10 does not include the water tank 400 (e.g., in a non-quint configuration, etc.).

As shown in FIGS. 1-3, 5-7, 10, 17, and 18, the aerial assembly 500 includes a turntable assembly, shown as turntable 510, pivotally coupled to the torque box 300; a platform, shown work platform 550, coupled to the turntable 510; a console, shown as control console 600, coupled to the turntable 510; a ladder assembly, shown as aerial ladder assembly 700, having a first end (e.g., a base end, a proximal end, a pivot end, etc.), shown as proximal end 702, pivotally coupled to the turntable 510, and an opposing second end (e.g., a free end, a distal end, a platform end, an implement end, etc.), shown as distal end 704; and an implement, shown as work basket 1300, coupled to the distal end 704.

Figure 12:
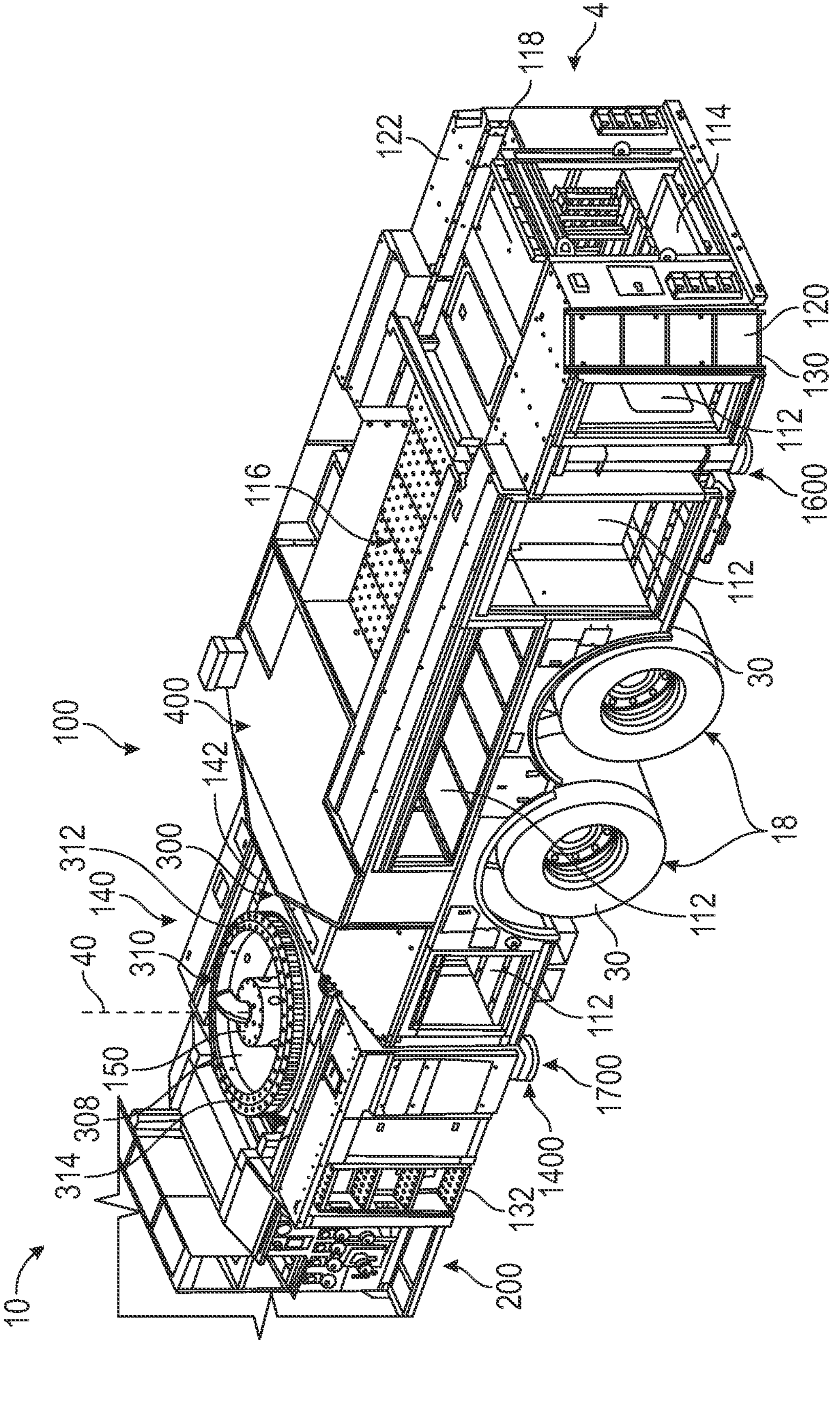
FIG. 12 is another rear perspective view of the rear assembly of FIG. 10 without a ladder assembly, according to an exemplary embodiment.
Figure 13:
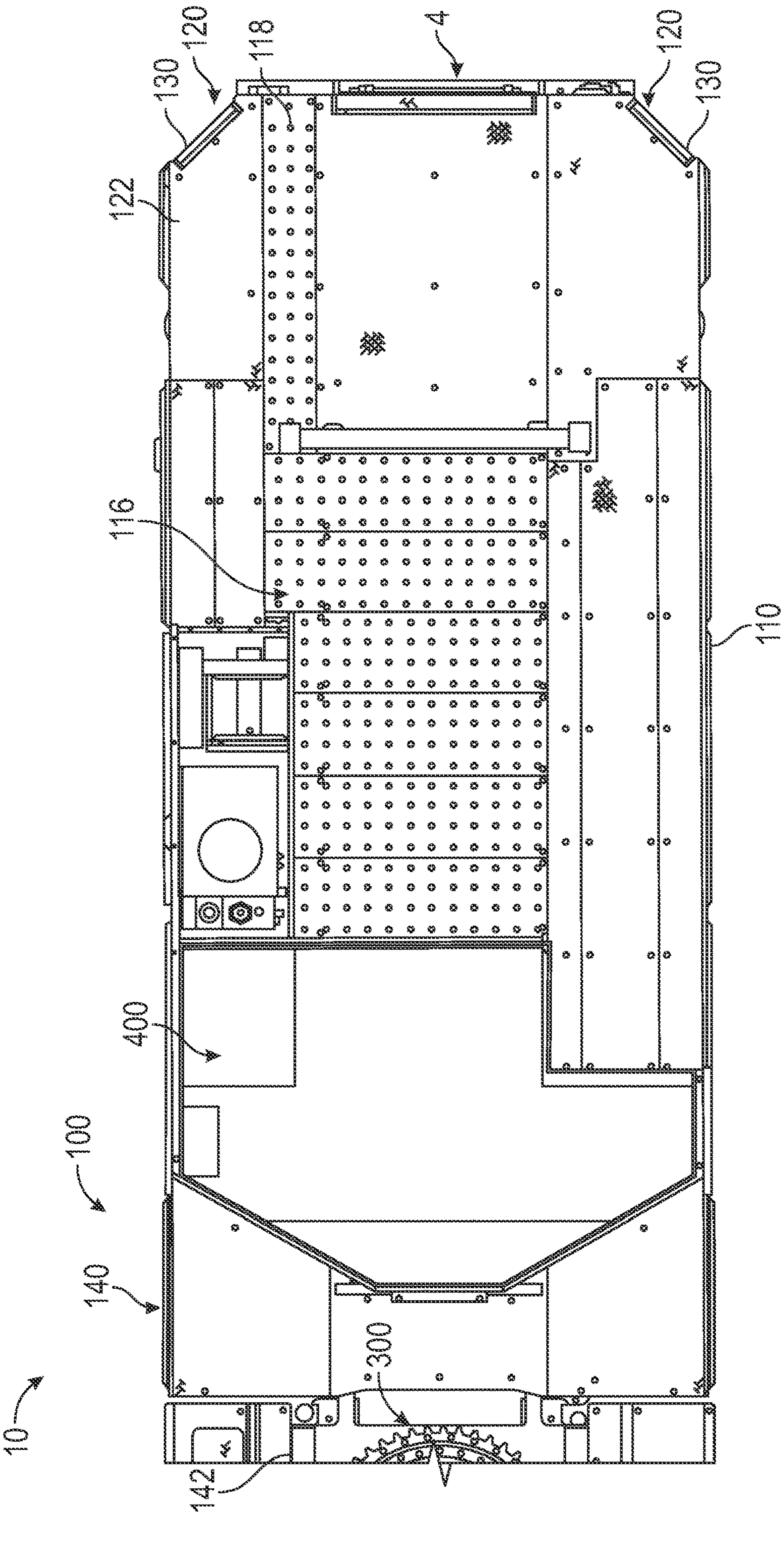
FIG. 13 is a top view of the rear assembly of FIG. 12, according to an exemplary embodiment.
Figure 14:
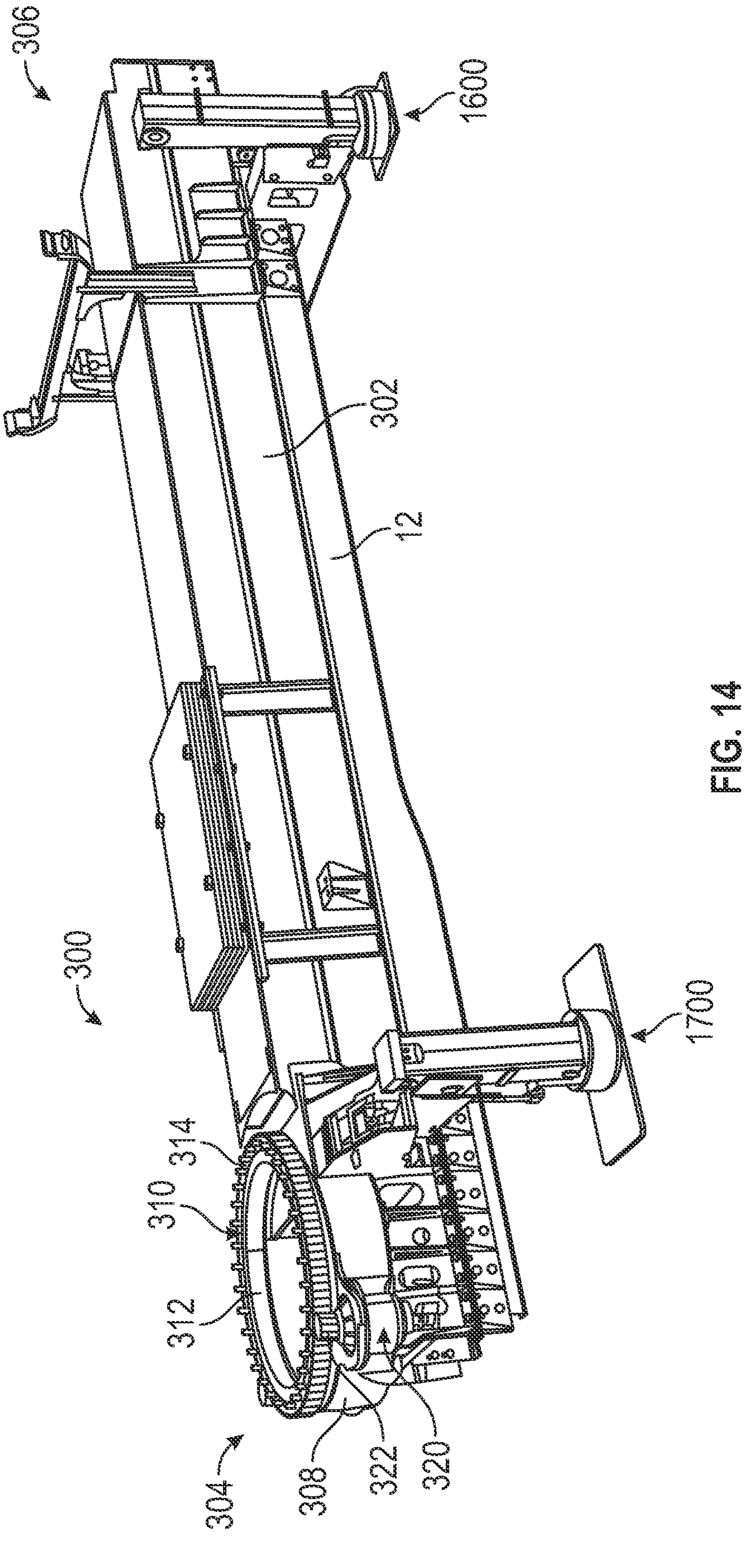
FIG. 14 is a perspective view of a torque box of the mid-mount fire apparatus of FIG. 1, according to an exemplary embodiment.
Figure 15:
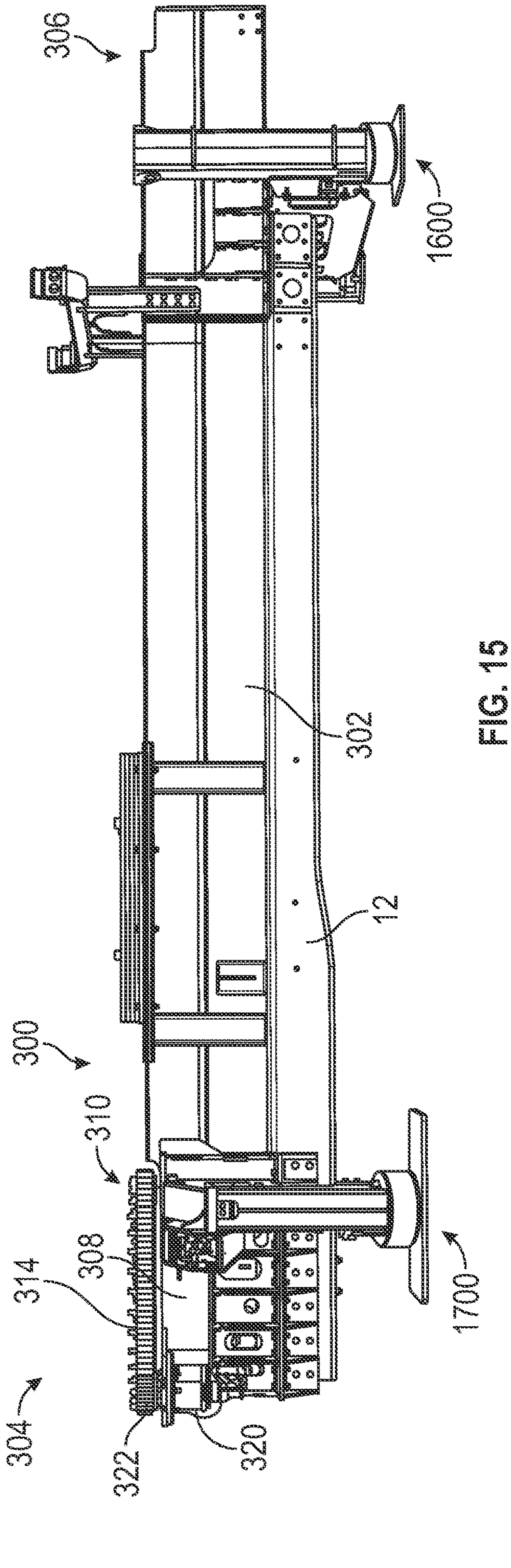
FIG. 15 is a side view of the torque box of FIG. 14, according to an exemplary embodiment.

As shown in FIGS. 1, 2, 4, 14, and 15, the torque box 300 is coupled to the frame 12. In one embodiment, the torque box 300 extends laterally the full width between the lateral outsides of the frame rails of the frame 12. As shown in FIGS. 14 and 15, the torque box 300 includes a body portion, shown as body 302, having a first end, shown as front end 304, and an opposing second end, shown as rear end 306. As shown in FIGS. 12, 14, and 15, the torque box 300 includes a support, shown as pedestal 308, coupled (e.g., attached, fixed, bolted, welded, etc.) to the front end 304 of the torque box 300. As shown in FIG. 12, the pedestal 308 extends through the pedestal opening 142 into the aerial assembly recess 140 such that the pedestal 308 is positioned (i) forward of the water tank 400 and the rear axles 18 and (ii) rearward of pump system 200, the front axle 16, and the front cabin 20.

Figure 2:
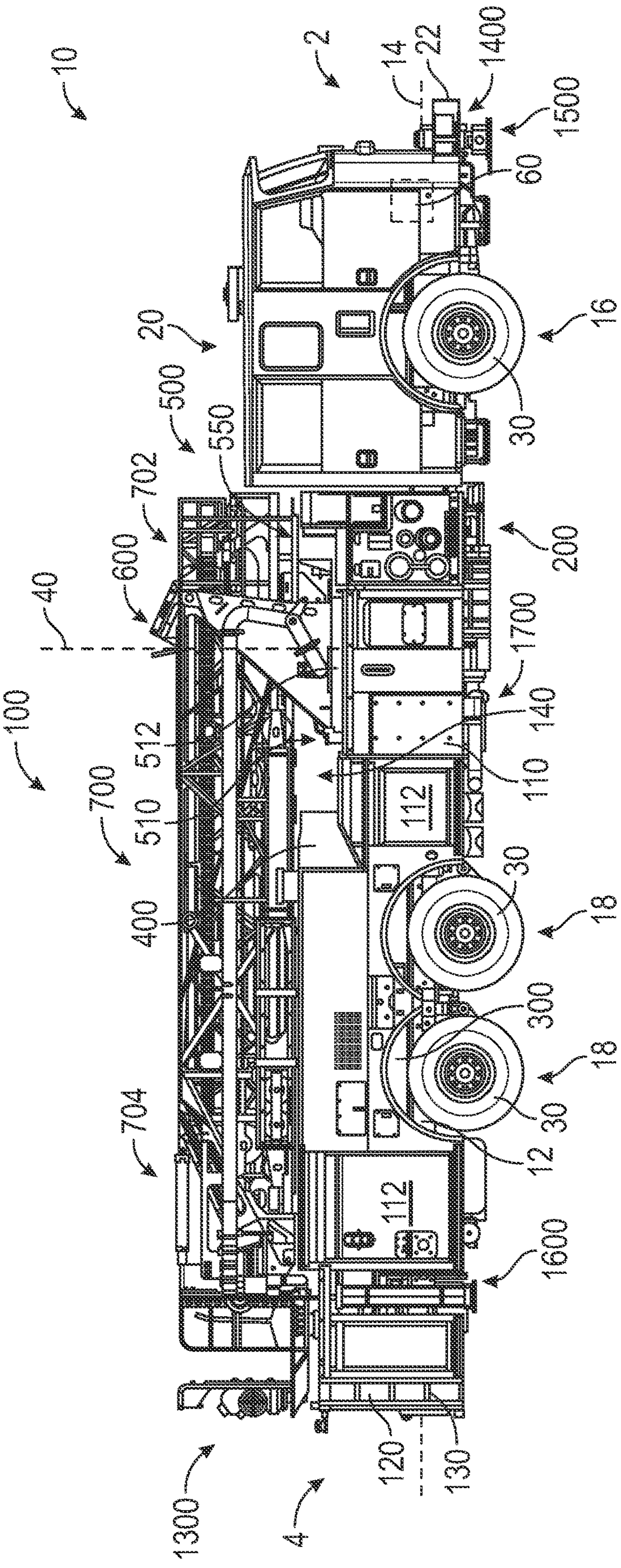
FIG. 2 is a right side view of the mid-mount fire apparatus of FIG. 1, according to an exemplary embodiment.

According to the exemplary embodiment shown in FIGS. 1, 2, and 12, the aerial assembly 500 (e.g., the turntable 510, the work platform 550, the control console 600, the aerial ladder assembly 700, the work basket 1300, etc.) is rotatably coupled to the pedestal 308 such that the aerial assembly 500 is selectively repositionable into a plurality of operating orientations about a vertical axis, shown as vertical pivot axis 40. As shown in FIGS. 12, 14, and 15, the torque box 300 includes a pivotal connector, shown as slewing bearing 310, coupled to the pedestal 308. The slewing bearing 310 is a rotational rolling-element bearing with an inner element, shown as bearing element 312, and an outer element, shown as driven gear 314. The bearing element 312 may be coupled to the pedestal 308 with a plurality of fasteners (e.g., bolts, etc.).

As shown in FIGS. 14 and 15, a drive actuator, shown as rotation actuator 320, is coupled to the pedestal 308 (e.g., by an intermediate bracket, etc.). The rotation actuator 320 is positioned to drive (e.g., rotate, turn, etc.) the driven gear 314 of the slewing bearing 310. In one embodiment, the rotation actuator 320 is an electric motor (e.g., an alternating current (AC) motor, a direct current motor (DC), etc.) configured to convert electrical energy into mechanical energy. In other embodiments, the rotation actuator 320 is powered by air (e.g., pneumatic, etc.), a fluid (e.g., a hydraulic motor, a hydraulic cylinder, etc.), mechanically (e.g., a flywheel, etc.), or still another power source.

As shown in FIGS. 14 and 15, the rotation actuator 320 includes a driver, shown as drive pinion 322. The drive pinion 322 is mechanically coupled with the driven gear 314 of the slewing bearing 310. In one embodiment, a plurality of teeth of the drive pinion 322 engage a plurality of teeth on the driven gear 314. By way of example, when the rotation actuator 320 is engaged (e.g., powered, turned on, etc.), the rotation actuator 320 may provide rotational energy (e.g., mechanical energy, etc.) to an output shaft. The drive pinion 322 may be coupled to the output shaft such that the rotational energy of the output shaft drives (e.g., rotates, etc.) the drive pinion 322. The rotational energy of the drive pinion 322 may be transferred to the driven gear 314 in response to the engaging teeth of both the drive pinion 322 and the driven gear 314. The driven gear 314 thereby rotates about the vertical pivot axis 40, while the bearing element 312 remains in a fixed position relative to the driven gear 314.

As shown in FIGS. 1, 2, and 16-18, the turntable 510 includes a first portion, shown as rotation base 512, and a second portion, shown as side supports 514, that extend vertically upward from opposing lateral sides of the rotation base 512. According to an exemplary embodiment, (i) the work platform 550 is coupled to the side supports 514, (ii) the aerial ladder assembly 700 is pivotally coupled to the side supports 514, (iii) the control console 600 is coupled to the rotation base 512, and (iv) the rotation base 512 is disposed within the aerial assembly recess 140 and interfaces with and is coupled to the driven gear 314 of slewing bearing 310 such that (i) the aerial assembly 500 is selectively pivotable about the vertical pivot axis 40 using the rotation actuator 320, (ii) at least a portion of the work platform 550 and the aerial ladder assembly 700 is positioned below the roof of the front cabin 20, and (iii) the turntable 510 is coupled rearward of the front cabin 20 and between the front axle 16 and the tandem rear axles 18 (e.g., the turntable 510 is coupled to the frame 12 such that the vertical pivot axis 40 is positioned rearward of a centerline of the front axle 16, forward of a centerline of the tandem rear axle 18, rearward of a rear edge of a tire of the front axle 16, forward of a front edge of a wheel of the front axle of the tandem rear axles 18, rearward of a front edge of a tire of the front axle 16, forward of a rear edge of a wheel of the rear axle of the tandem rear axles 18, etc.). Accordingly, loading from the work basket 1300, the aerial ladder assembly 700, and/or the work platform 550 may transfer through the turntable 510 into the torque box 300 and the frame 12.

As shown in FIG. 12, the rear assembly 100 includes a rotation swivel, shown as rotation swivel 316, that includes a conduit. According to an exemplary embodiment, the conduit of the rotation swivel 316 extends upward from the pedestal 308 and into the turntable 510. The rotation swivel 316 may couple (e.g., electrically, hydraulically, fluidly, etc.) the aerial assembly 500 with other components of the fire apparatus 10. By way of example, the conduit may define a passageway for water to flow into the aerial ladder assembly 700. Various lines may provide electricity, hydraulic fluid, and/or water to the aerial ladder assembly 700, actuators, and/or the control console 600.

According to an exemplary embodiment, the work platform 550 provides a surface upon which operators (e.g., fire fighters, rescue workers, etc.) may stand while operating the aerial assembly 500 (e.g., with the control console 600, etc.). The control console 600 may be communicably coupled to various components of the fire apparatus 10 (e.g., actuators of the aerial ladder assembly 700, rotation actuator 320, water turret, etc.) such that information or signals (e.g., command signals, fluid controls, etc.) may be exchanged from the control console 600. The information or signals may relate to one or more components of the fire apparatus 10. According to an exemplary embodiment, the control console 600 enables an operator (e.g., a fire fighter, etc.) of the fire apparatus 10 to communicate with one or more components of the fire apparatus 10. By way of example, the control console 600 may include at least one of an interactive display, a touchscreen device, one or more buttons (e.g., a stop button configured to cease water flow through a water nozzle, etc.), joysticks, switches, and voice command receivers. An operator may use a joystick associated with the control console 600 to trigger the actuation of the turntable 510 and/or the aerial ladder assembly 700 to a desired angular position (e.g., to the front, back, or side of fire apparatus 10, etc.). By way of another example, an operator may engage a lever associated with the control console 600 to trigger the extension or retraction of the aerial ladder assembly 700.

Figure 16:
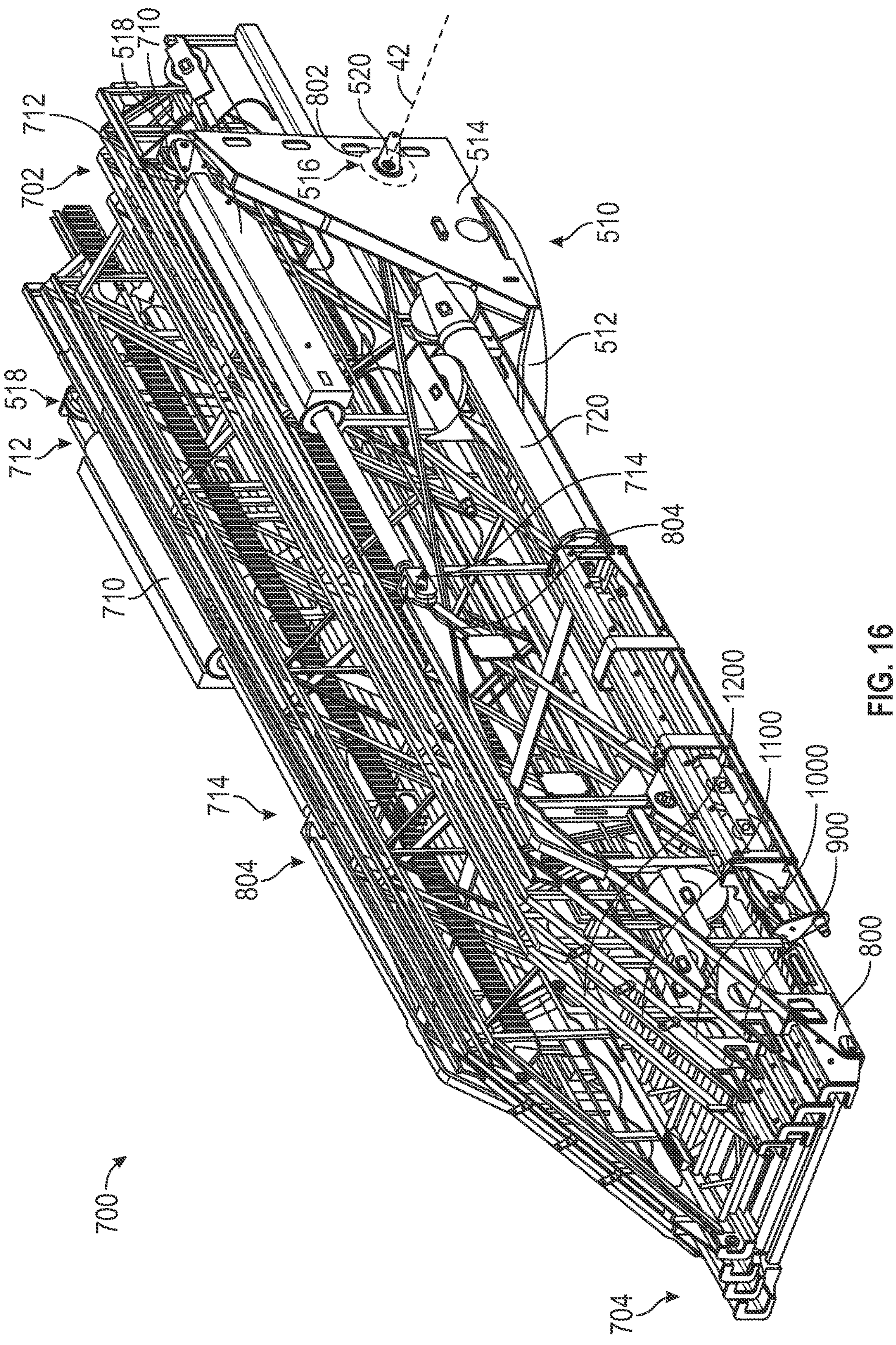
FIG. 16 is a perspective view of an aerial ladder assembly and turntable of the mid-mount fire apparatus of FIG. 1, according to an exemplary embodiment.
Figure 17:
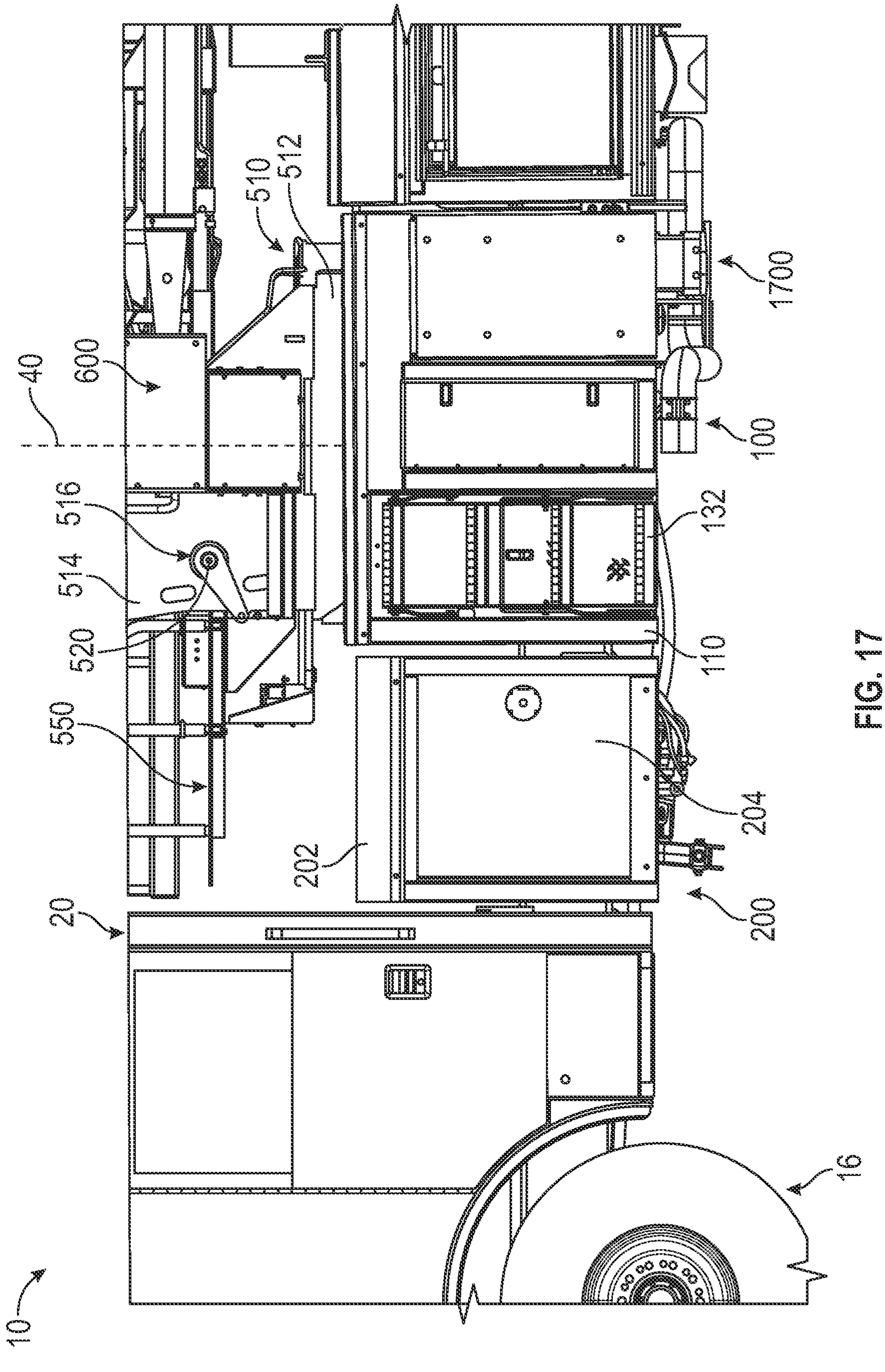
FIG. 17 is a side view of a pump housing of the mid-mount fire apparatus of FIG. 1 in a first configuration, according to an exemplary embodiment.

As shown in FIG. 16, the aerial ladder assembly 700 has a plurality of nesting ladder sections that telescope with respect to one another including a first section, shown as base section 800; a second section, shown as lower middle section 900; a third ladder section, shown as middle section 1000; a fourth section, shown as upper middle section 1100; and a fifth section, shown as fly section 1200. As shown in FIGS. 16 and 17, the side supports 514 of the turntable 510 define a first interface, shown as ladder interface 516, and a second interface, shown as actuator interface 518. As shown in FIG. 16, the base section 800 of the aerial ladder assembly 700 defines first interfaces, shown as pivot interfaces 802, and second interfaces, shown as actuator interfaces 804. As shown in FIGS. 16 and 17, the ladder interfaces 516 of the side supports 514 of the turntable 510 and the pivot interfaces 802 of the base section 800 are positioned to align and cooperatively receive a pin, shown as heel pin 520, to pivotally couple the proximal end 702 of the aerial ladder assembly 700 to the turntable 510. As shown in FIG. 17, the aerial ladder assembly 700 includes first ladder actuators (e.g., hydraulic cylinders, etc.), shown as pivot actuators 710. Each of the pivot actuators 710 has a first end, shown as end 712, coupled to a respective actuator interface 518 of the side supports 514 of the turntable 510 and an opposing second end, shown as end 714, coupled to a respective actuator interface 804 of the base section 800. According to an exemplary embodiment, the pivot actuators 710 are kept in tension such that retraction thereof lifts and rotates the distal end 704 of the aerial ladder assembly 700 about a lateral axis, shown as lateral pivot axis 42, defined by the heel pin 520. In other embodiments, the pivot actuators 710 are kept in compression such that extension thereof lifts and rotates the distal end 704 of the aerial ladder assembly 700 about the lateral pivot axis 42. In an alternative embodiment, the aerial ladder assembly only includes one pivot actuator 710.

As shown in FIG. 16, the aerial ladder assembly 700 includes one or more second ladders actuators, shown as extension actuators 720. According to an exemplary embodiment, the extension actuators 720 are positioned to facilitate selectively reconfiguring the aerial ladder assembly 700 between an extended configuration and a retracted/stowed configuration (see, e.g., FIGS. 1-3, 16, etc.). In the extended configuration (e.g., deployed position, use position, etc.), the aerial ladder assembly 700 is lengthened, and the distal end 704 is extended away from the proximal end 702. In the retracted configuration (e.g., storage position, transport position, etc.), the aerial ladder assembly 700 is shortened, and the distal end 704 is withdrawn towards the proximal end 702.

According to the exemplary embodiment shown in FIGS. 1-3 and 16, the aerial ladder assembly 700 has over-retracted ladder sections such that the proximal ends of the lower middle section 900, the middle section 1000, the upper middle section 1100, and the fly section 1200 extend forward of (i) the heel pin 520 and (ii) the proximal end of the base section 800 along the longitudinal axis 14 of the fire apparatus 10 when the aerial ladder assembly 700 is retracted and stowed. According to an exemplary embodiment, the distal end 704 of the aerial ladder assembly 700 (e.g., the distal end of the fly section 1200, etc.) is extensible to the horizontal reach of at least 88 feet (e.g., 93 feet, etc.) and/or or a vertical reach of at least 95 feet (e.g., 100 feet, etc.). According to an exemplary embodiment, the aerial ladder assembly 700 is operable below grade (e.g., at a negative depression angle relative to a horizontal, etc.) within an aerial work envelope or scrub area. In one embodiment, the aerial ladder assembly 700 is operable in the scrub area such that it may pivot about the vertical pivot axis 40 up to 50 degrees (e.g., 20 degrees forward and 30 degrees rearward from a position perpendicular to the longitudinal axis 14, etc.) on each side of the body 110 while at a negative depression angle (e.g., up to negative 15 degrees, more than negative 15 degrees, up to negative 20 degrees, etc. below level, below a horizontal defined by the top platform 122 of the body 110, etc.).

Figure 3:
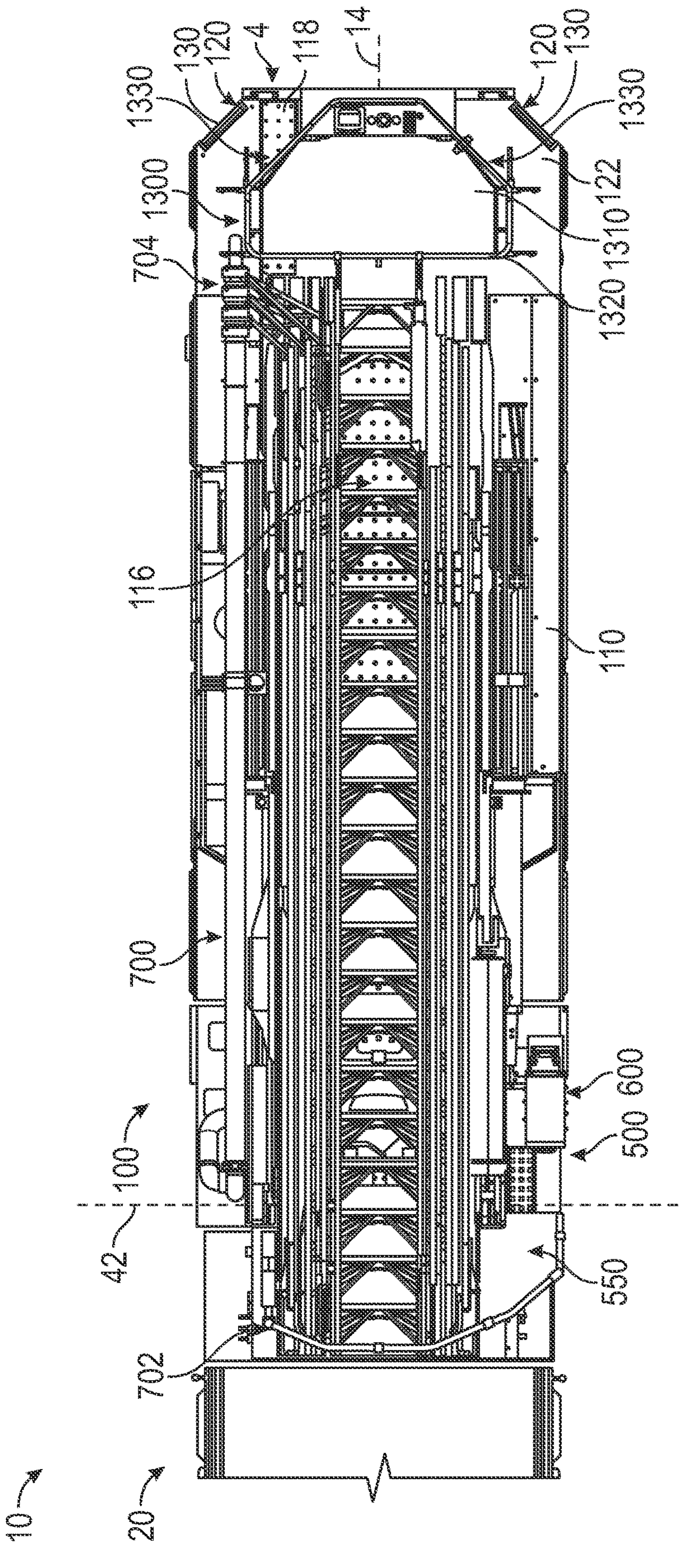
FIG. 3 is a top view of the mid-mount fire apparatus of FIG. 1, according to an exemplary embodiment.
Figure 4:
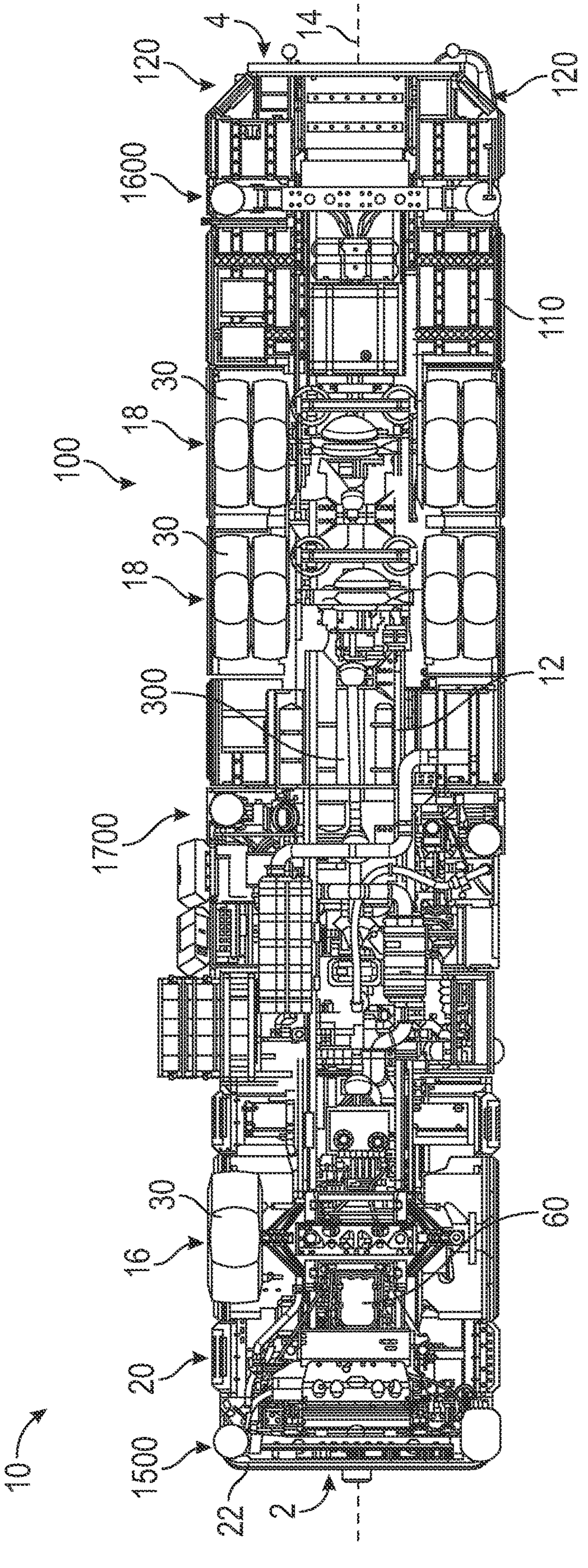
FIG. 4 is a bottom view of the mid-mount fire apparatus of FIG. 1, according to an exemplary embodiment.
Figure 5:
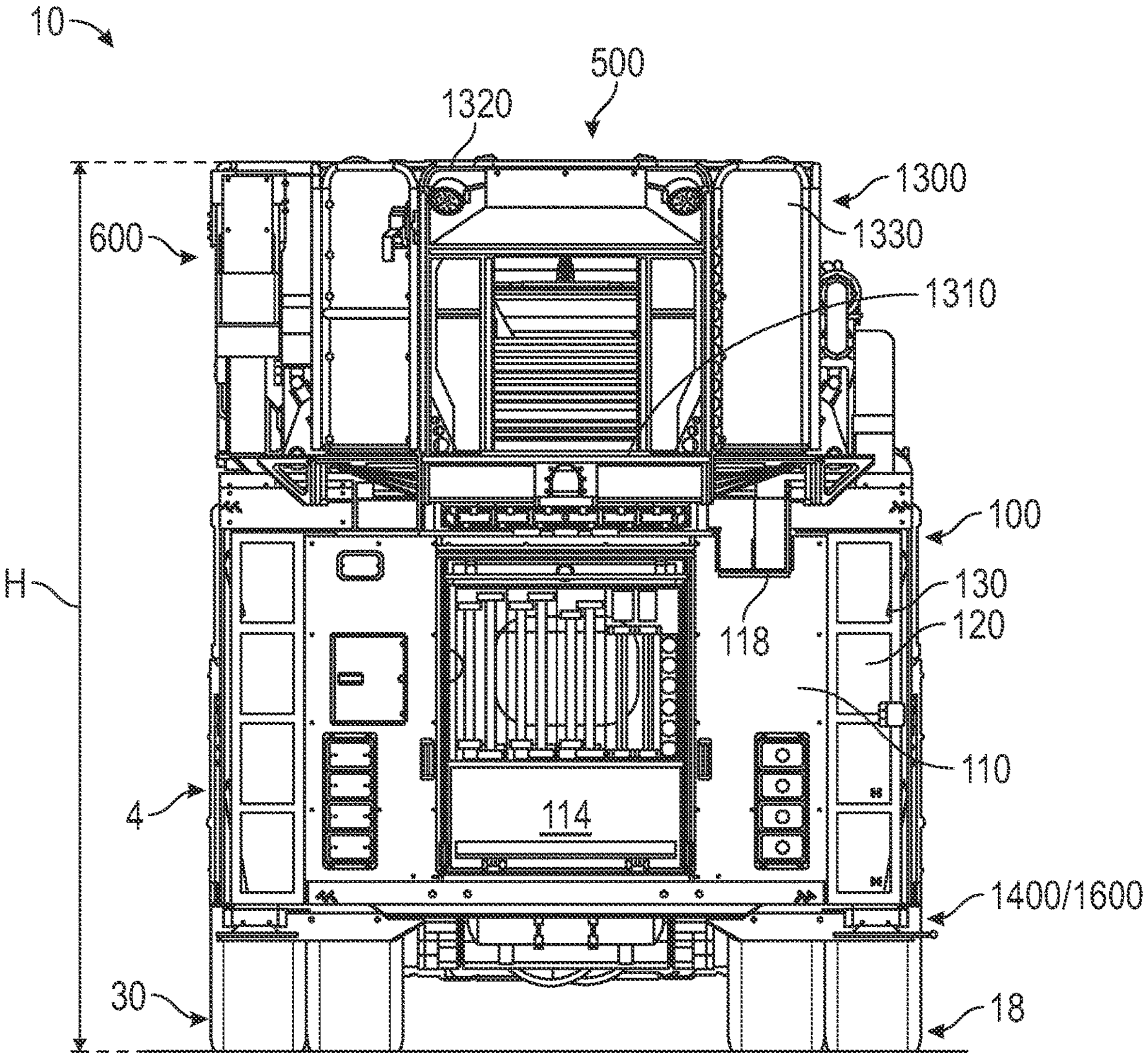
FIG. 5 is a rear view of the mid-mount fire apparatus of FIG. 1, according to an exemplary embodiment.
Figure 10:
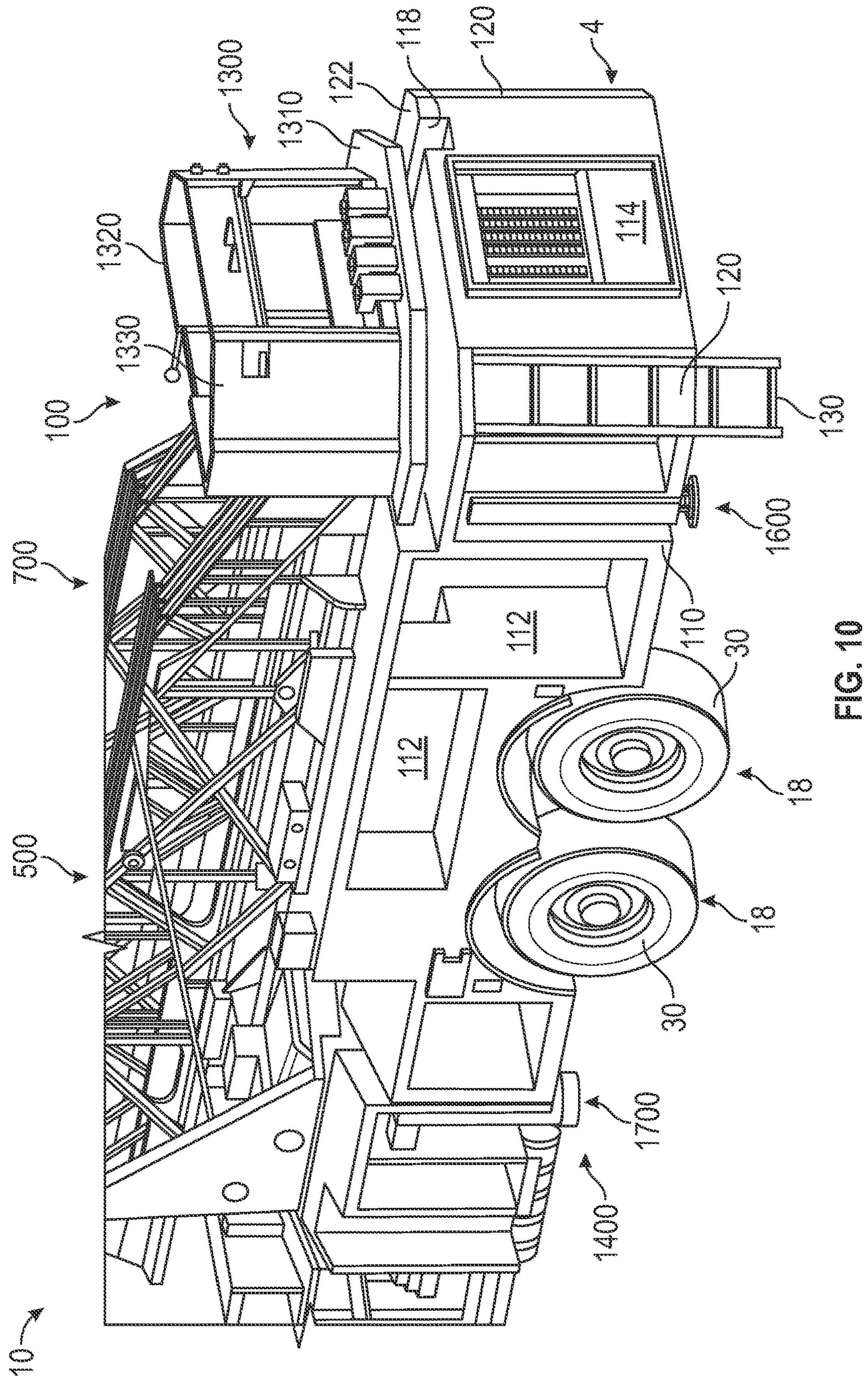
FIG. 10 is a rear perspective view of a rear assembly of the mid-mount fire apparatus of FIG. 1, according to an exemplary embodiment.
Figure 11:
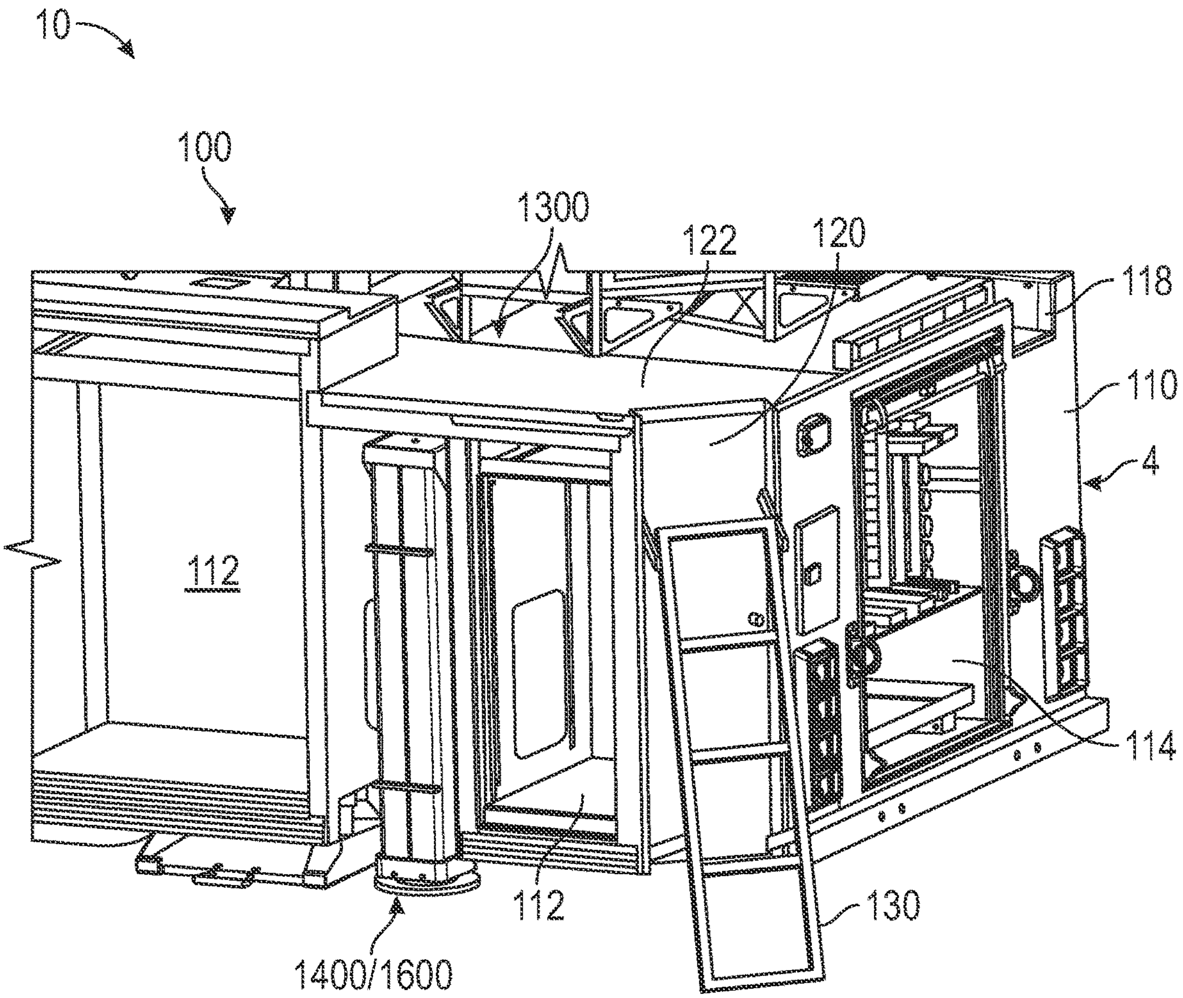
FIG. 11 is detailed rear perspective view of the rear assembly of FIG. 10, according to an exemplary embodiment.

According to an exemplary embodiment, the work basket 1300 is configured to hold at least one of fire fighters and persons being aided by the fire fighters. As shown in FIGS. 3, 5, and 10, the work basket 1300 includes a platform, shown as basket platform 1310; a support, shown as railing 1320, extending around the periphery of the basket platform 1310; and angled doors, shown as basket doors 1330, coupled to the corners of the railing 1320 proximate the rear end 4 of the fire apparatus 10. According to an exemplary embodiment, the basket doors 1330 are angled to correspond with the chamfered corners 120 of the body 110.

In other embodiments, the aerial assembly 500 does not include the work basket 1300. In some embodiments, the work basket 1300 is replaced with or additionally includes a nozzle (e.g., a deluge gun, a water cannon, a water turret, etc.) or other tool. By way of example, the nozzle may be connected to a water source (e.g., the water tank 400, an external source, etc.) with a conduit extending along the aerial ladder assembly 700 (e.g., along the side of the aerial ladder assembly 700, beneath the aerial ladder assembly 700, in a channel provided in the aerial ladder assembly 700, etc.). By pivoting the aerial ladder assembly 700 into a raised position, the nozzle may be elevated to expel water from a higher elevation to facilitate suppressing a fire.

According to an exemplary embodiment, the pump system 200 (e.g., a pump house, etc.) is a mid-ship pump assembly. As shown in FIGS. 1, 2, 12, 17, and 18, the pump system 200 is positioned along the rear assembly 100 behind the front cabin 20 and forward of the vertical pivot axis 40 (e.g., forward of the turntable 510, the torque box 300, the pedestal 308, the slewing bearing 310, the heel pin 520, a front end of the body 110, etc.) such that the work platform 550 and the over-retracted portions of the aerial ladder assembly 700 overhang above the pump system 200 when the aerial ladder assembly 700 is retracted and stowed. According to an exemplary embodiment, the position of the pump system 200 forward of the vertical pivot axis 40 facilitates ease of install and serviceability. In other embodiments, the pump system 200 is positioned rearward of the vertical pivot axis 40.

Figure 18:
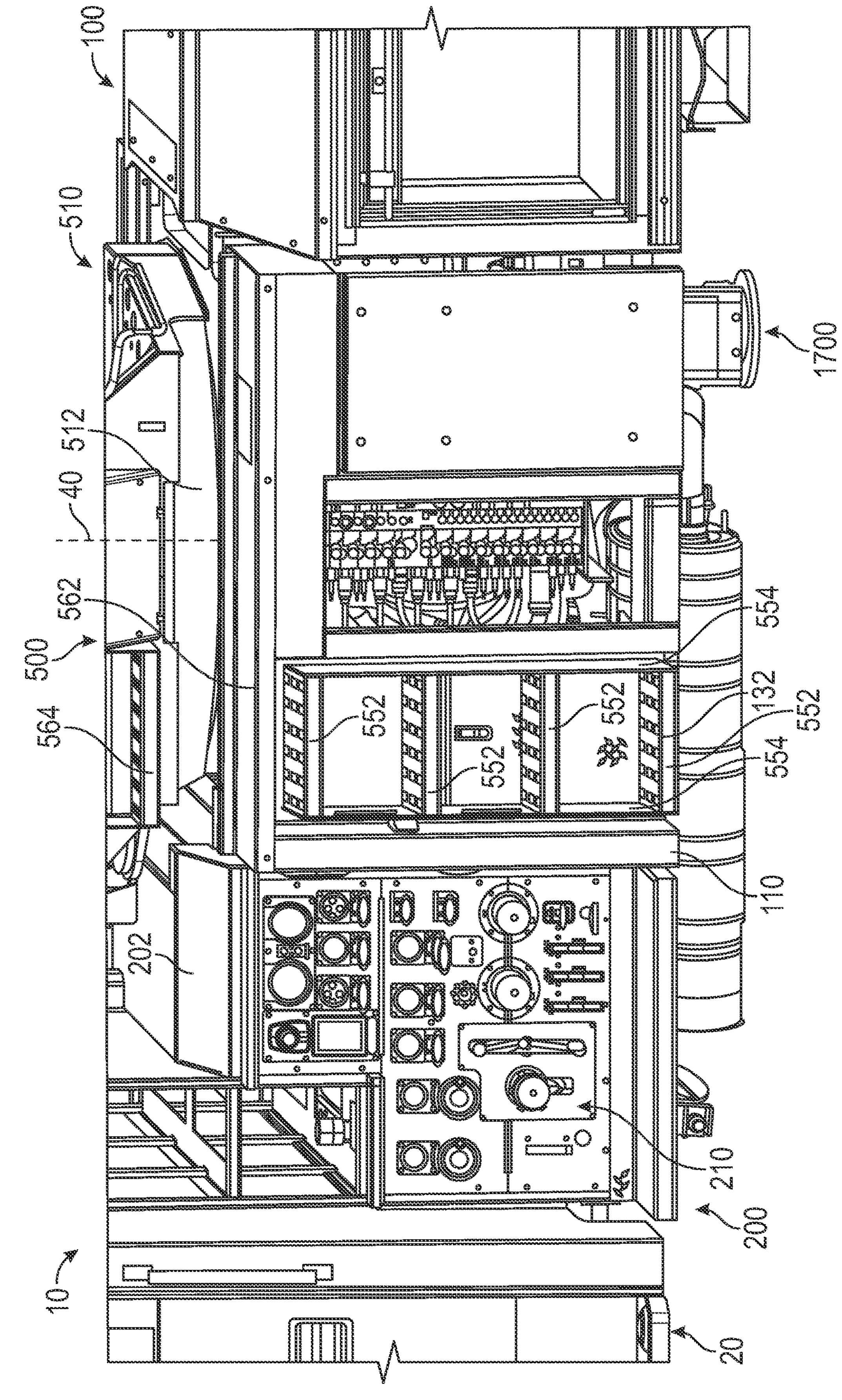
FIG. 18 is a side perspective view of a pump system within the pump housing of FIG. 17 in a second configuration, according to an exemplary embodiment.
Figure 19:
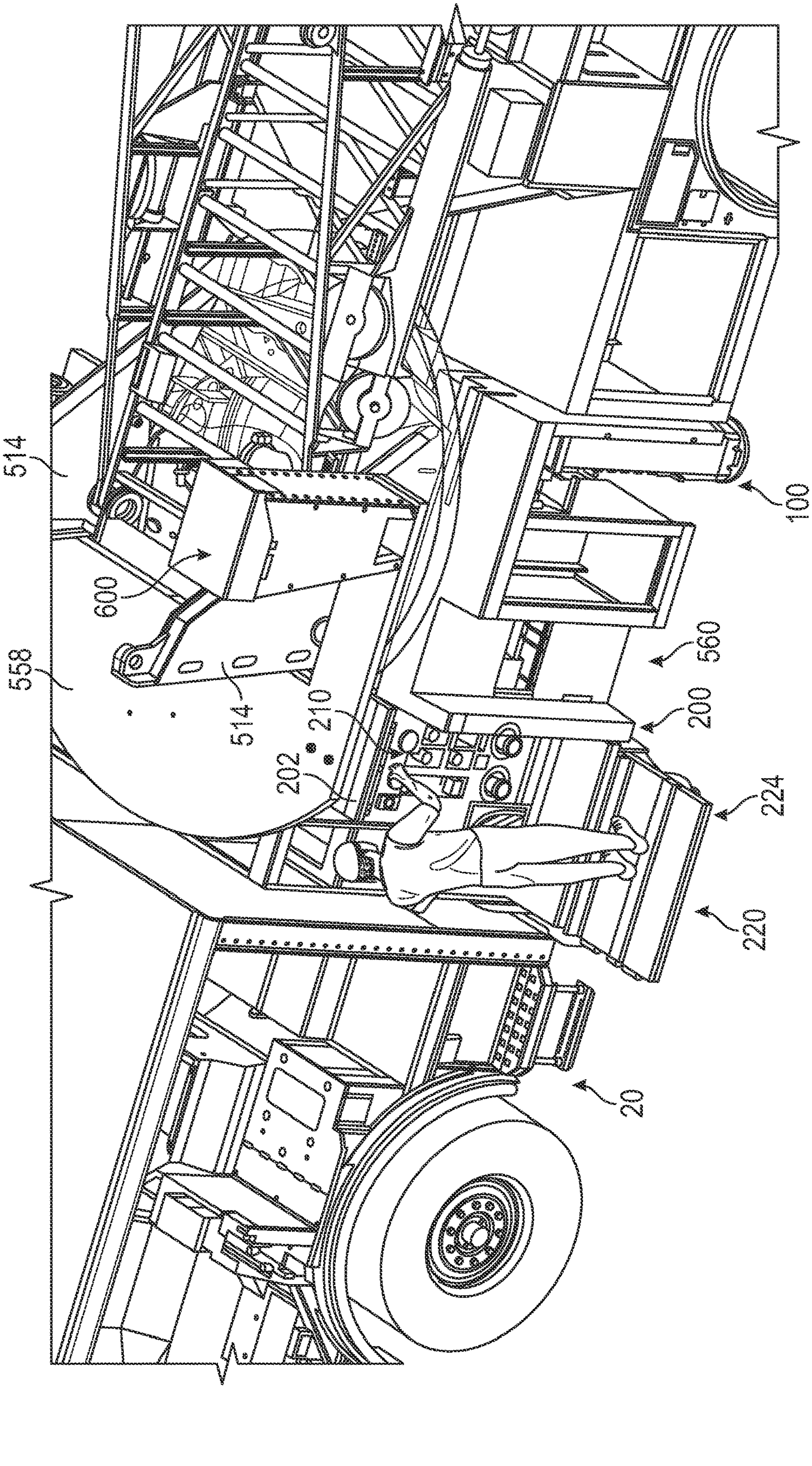
FIG. 19 is a side perspective view of the pump system of FIG. 18 with a platform in a deployed configuration, according to an exemplary embodiment.
Figure 20:
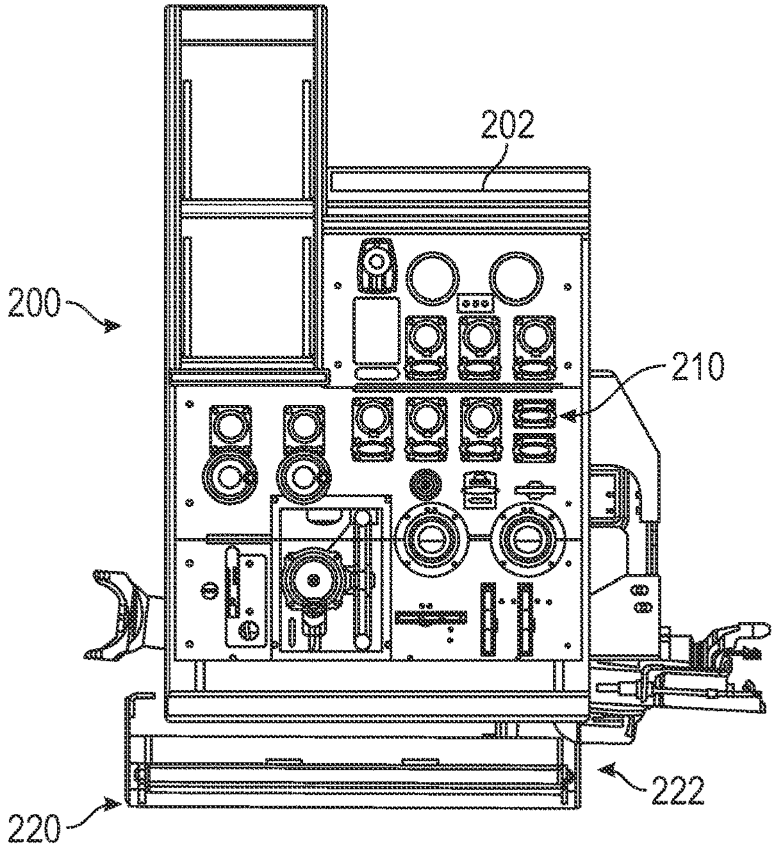
FIGS. 20 and 21 are opposing side views of the pump system of FIG. 18, according to an exemplary embodiment.
Figure 21:
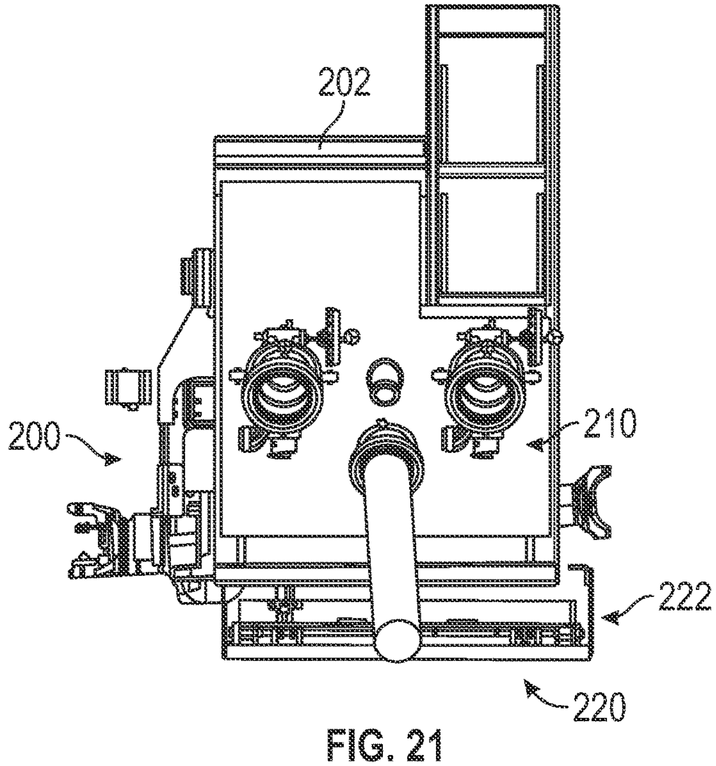

As shown in FIGS. 17-21, the pump system 200 includes a housing, shown as pump house 202. As shown in FIG. 17, the pump house 202 includes a selectively openable door, shown as pump door 204. As shown in FIGS. 18-21, the pump system 200 includes a pumping device, shown as pump assembly 210, disposed within the pump house 202. By way of example, the pump assembly 210 may include a pump panel having an inlet for the entrance of water from an external source (e.g., a fire hydrant, etc.), a pump, an outlet configured to engage a hose, various gauges, etc. The pump of the pump assembly 210 may pump fluid (e.g., water, agent, etc.) through a hose to extinguish a fire (e.g., water received at an inlet of the pump house 202, water stored in the water tank 400, etc.). As shown in FIGS. 19-21, the pump system 200 includes a selectively deployable (e.g., foldable, pivotable, collapsible, etc.) platform, shown as pump platform 220, pivotally coupled to the pump house 202. As shown in FIGS. 20 and 21, the pump platform 220 is in a first configuration, shown as stowed configuration 222, and as shown in FIG. 19, the pump platform 220 is in a second configuration, shown as deployed configuration 224.

Figure 6:
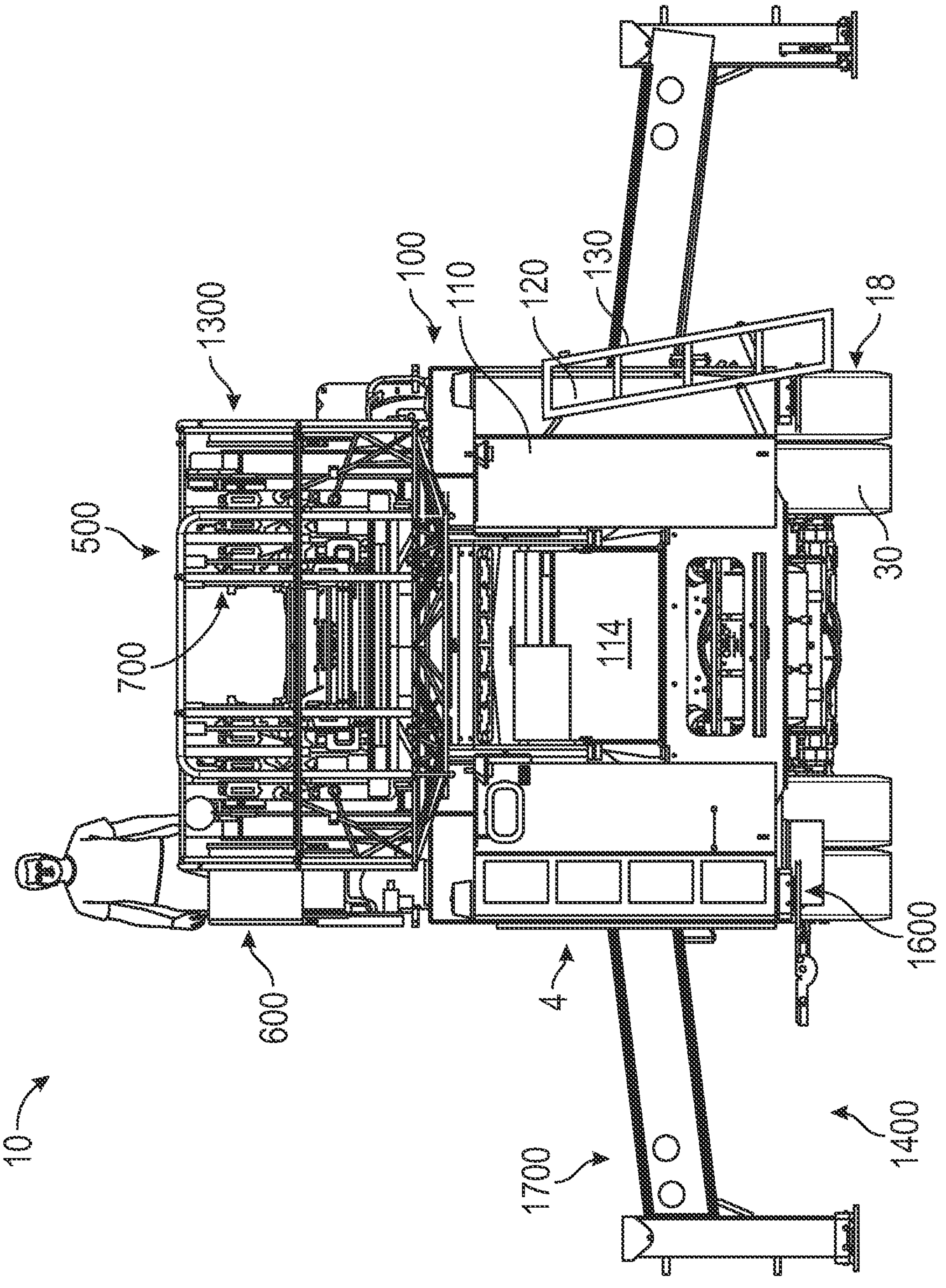
FIG. 6 is a is a rear view of the mid-mount fire apparatus of FIG. 1 having outriggers in an extended configuration, according to an exemplary embodiment.
Figure 7:
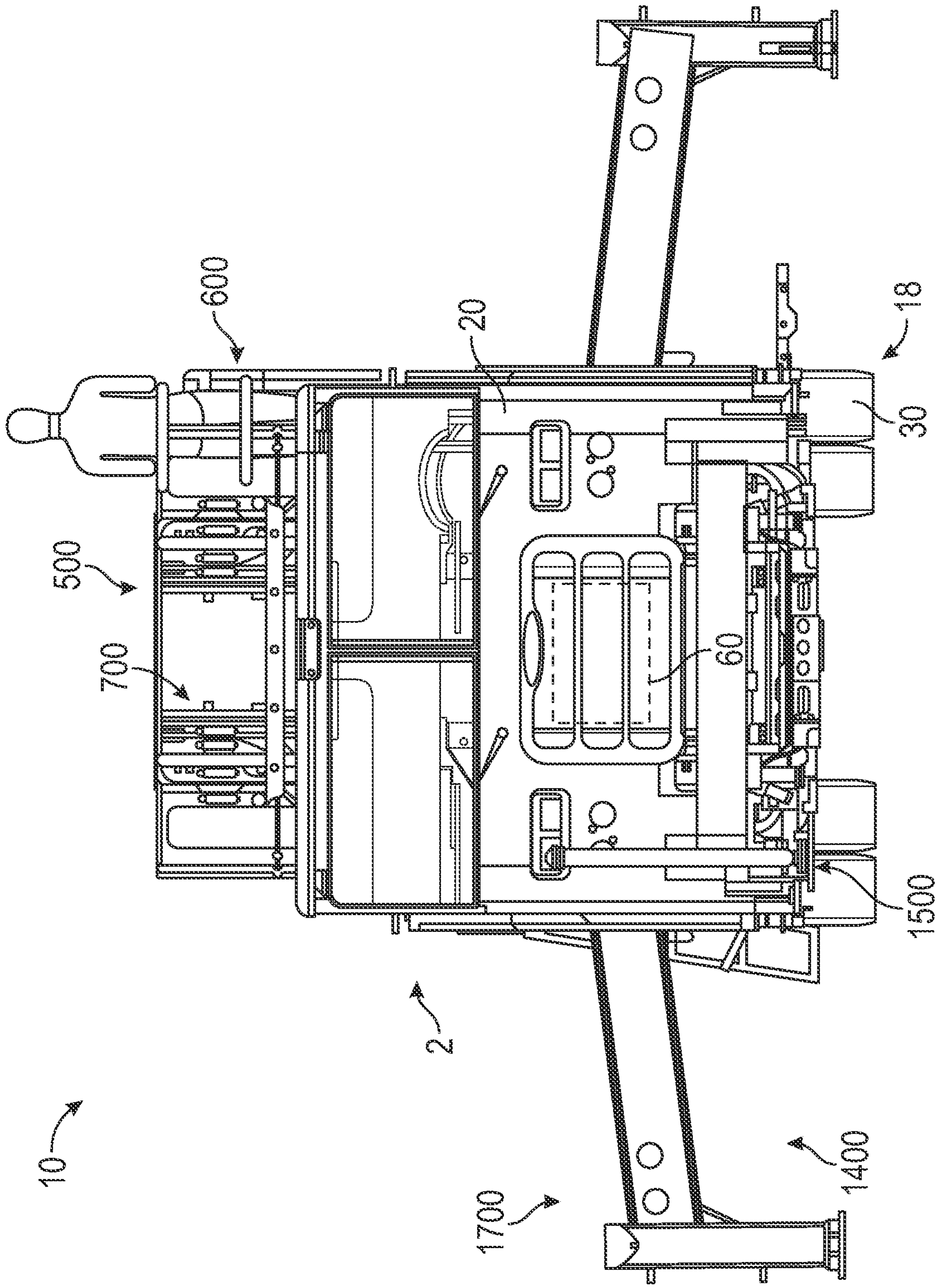
FIG. 7 is a front view of the mid-mount fire apparatus of FIG. 1 having outriggers in an extended configuration, according to an exemplary embodiment.

As shown in FIGS. 1, 2, 4, 6, 7, 10-12, 14, and 15, the fire apparatus 10 includes a stability system, shown as stability assembly 1400. As shown in FIGS. 1, 2, 4, and 7, the stability assembly 1400 includes first stabilizers, shown as front downriggers 1500, coupled to each lateral side of the front bumper 22 at the front end 2 of the front cabin 20. In other embodiments, the front downriggers 1500 are otherwise coupled to the fire apparatus 10 (e.g., to the front end 2 of the frame 12, etc.). According to an exemplary embodiment, the front downriggers 1500 are selectively deployable (e.g., extendable, etc.) downward to engage a ground surface. As shown in FIGS. 1, 2, 4-6, 10-12, 14, and 15, the stability assembly 1400 includes second stabilizers, shown as rear downriggers 1600, coupled to each lateral side of the rear end 4 of the frame 12 and/or the rear end 306 of the torque box 300. According to an exemplary embodiment, the rear downriggers 1600 are selectively deployable (e.g., extendable, etc.) downward to engage a ground surface. As shown in FIGS. 1, 2, 4, 6, 7, 10, 12, 14, 15, 17, and 18, the stability assembly 1400 includes third stabilizers, shown outriggers 1700, coupled to the front end 304 of the torque box 300 between the pedestal 308 and the body 302. As shown in FIGS. 6 and 7, the outriggers 1700 are selectively deployable (e.g., extendable, etc.) outward from each of the lateral sides of the body 110 and/or downward to engage a ground surface. According to an exemplary embodiment, the outriggers 1700 are extendable up to a distance of eighteen feet (e.g., measured between the center of a pad of a first outrigger and the center of a pad of a second outrigger, etc.). In other embodiments, the outriggers 1700 are extendable up to a distance of less than or greater than eighteen feet.

According to an exemplary embodiment, the front downriggers 1500, the rear downriggers 1600, and the outriggers 1700 are positioned to transfer the loading from the aerial ladder assembly 700 to the ground. For example, a load applied to the aerial ladder assembly 700 (e.g., a fire fighter at the distal end 704, a wind load, etc.) may be conveyed into to the turntable 510, through the pedestal 308 and the torque box 300, to the frame 12, and into the ground through the front downriggers 1500, the rear downriggers 1600, and/or the outriggers 1700. When the front downriggers 1500, the rear downriggers 1600, and/or the outriggers 1700 engage with a ground surface, portions of the fire apparatus 10 (e.g., the front end 2, the rear end 4, etc.) may be elevated relative to the ground surface. One or more of the wheel and tire assemblies 30 may remain in contact with the ground surface, but may not provide any load bearing support. While the fire apparatus 10 is being driven or not in use, the front downriggers 1500, the rear downriggers 1600, and the outriggers 1700 may be retracted into a stored position.

According to an exemplary embodiment, with (i) the front downriggers 1500, the rear downriggers 1600, and/or the outriggers 1700 extended and (ii) the aerial ladder assembly 700 fully extended (e.g., at a horizontal reach of 88 feet, at a vertical reach of 95 feet, etc.), the fire apparatus 10 withstands a rated tip load (e.g., rated meaning that the fire apparatus 10 can, from a design-engineering perspective, withstand a greater tip load, with an associated factor of safety of at least two, meets National Fire Protection Association ("NFPA") requirements, etc.) of at least 1,000 pounds applied to the work basket 1300, in addition to the weight (e.g., approximately 700 pounds, etc.) of the work basket 1300. In embodiments where the aerial assembly 500 does not include the work basket 1300, the fire apparatus 10 may have a rated tip load of more than 1,000 pounds (e.g., 1,250 pounds, etc.) when the aerial ladder assembly 700 is fully extended.

According to an exemplary embodiment, the tandem rear axles 18 have a gross axle weight rating of up to 48,000 pounds and the fire apparatus 10 does not exceed the 48,000 pound tandem-rear axle rating. The front axle 16 may have a 24,000 pound axle rating. Traditionally, mid-mount fire trucks have greater than a 48,000 pound loading on the tandem rear-axles thereof. However, some state regulations prevent vehicles having such a high axle loading, and, therefore, the vehicles are unable to be sold and operated in such states. Advantageously, the fire apparatus 10 of the present disclosure has a gross axle weight loading of at most 48,000 pounds on the tandem rear axles 18, and, therefore, the fire apparatus 10 may be sold and operated in any state of the United States.

Figure 8:
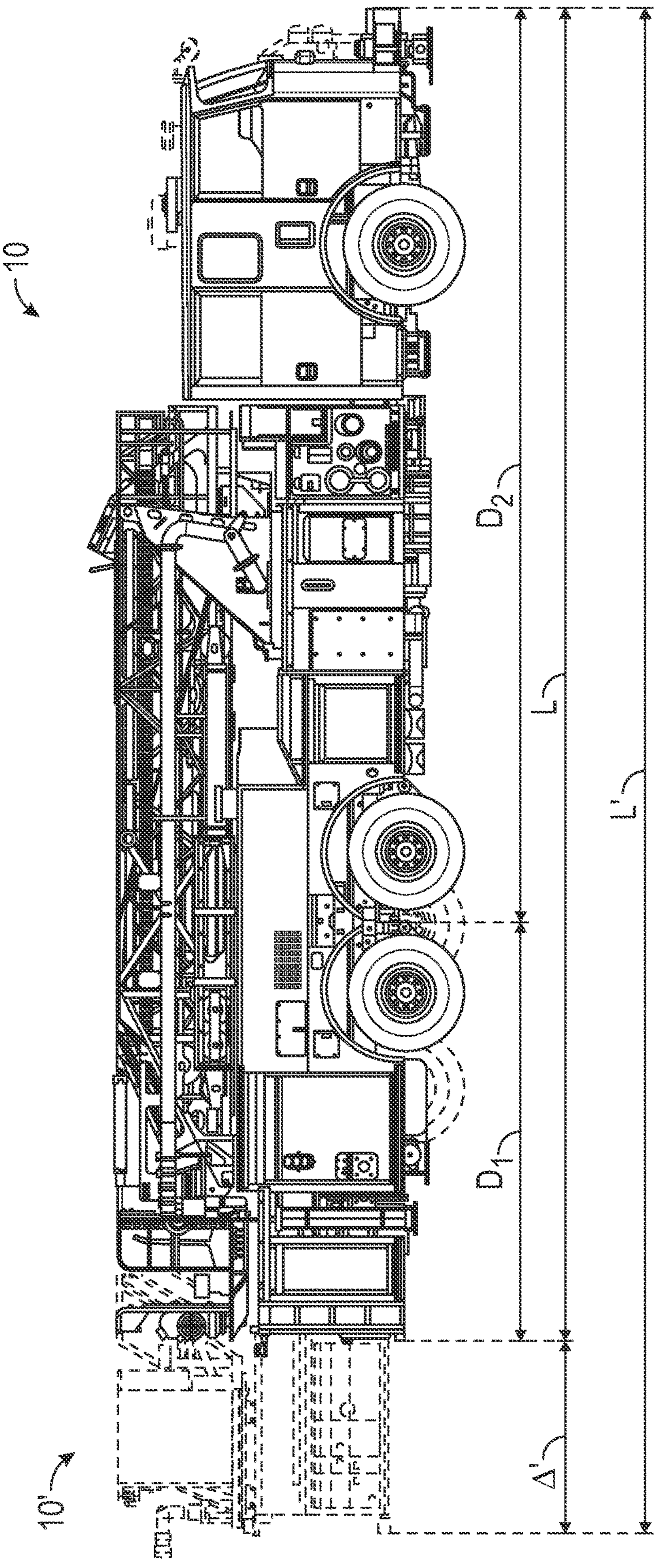
FIG. 8 is a side view of the mid-mount fire apparatus of FIG. 1 relative to a traditional mid-mount fire apparatus, according to an exemplary embodiment.
Figure 9:
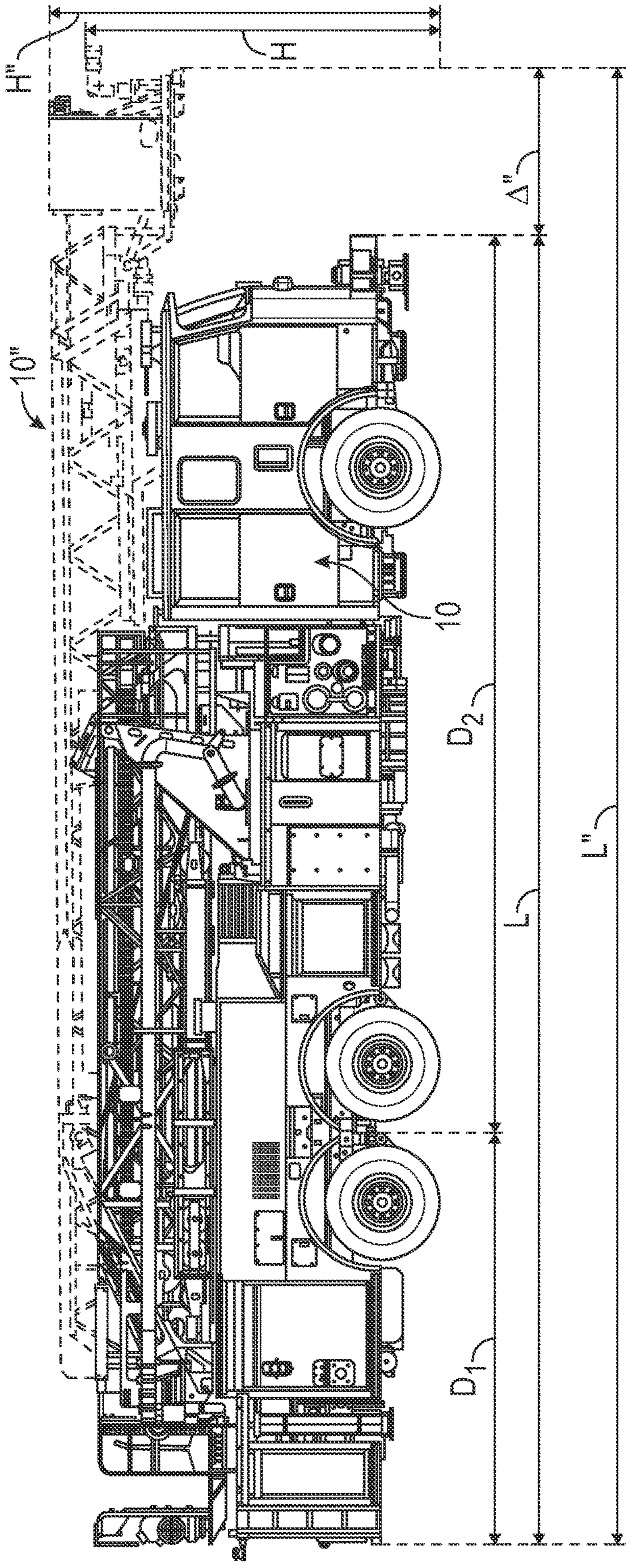
FIG. 9 is a side view of the mid-mount fire apparatus of FIG. 1 relative to a traditional rear-mount fire apparatus, according to an exemplary embodiment.

As shown in FIGS. 5 and 9, the fire apparatus 10 has a height H. According to an exemplary embodiment, the height H of the fire apparatus 10 is at most 128 inches (i.e., 10 feet, 8 inches). In other embodiments, the fire apparatus 10 has a height greater than 128 inches. As shown in FIGS. 8 and 9, the fire apparatus 10 has a longitudinal length L. According to an exemplary embodiment, the longitudinal length L of the fire apparatus 10 is at most 502 inches (i.e., 41 feet, 10 inches). In other embodiments, the fire apparatus 10 has a length L greater than 502 inches. As shown in FIGS. 8 and 9, the fire apparatus 10 has a distance $D_1$ between the rear end 4 of the body 110 and the middle of the tandem rear axles 18 (e.g., a body rear overhang portion, etc.). According to an exemplary embodiment, the distance $D_1$ of the fire apparatus 10 is at most 160 inches (i.e., 13 feet, 4 inches). In other embodiments, the fire apparatus 10 has a distance $D_1$ greater than 160 inches. As shown in FIGS. 8 and 9, the fire apparatus 10 has a distance $D_2$ between the front end 2 of the front cabin 20 (excluding the front bumper 22) and the middle of the tandem rear axles 18. According to an exemplary embodiment, the distance $D_2$ of the fire apparatus 10 is approximately twice or at least twice that of the distance $D_1$ (e.g., approximately 321 inches, approximately 323 inches, at least 320 inches, etc.).

As shown in FIG. 8, the longitudinal length L of the fire apparatus 10 is compared to the longitudinal length L' of a traditional mid-mount fire apparatus 10'. As shown in FIG. 8, when the front axles of the fire apparatus 10 and the fire apparatus 10' are aligned, the fire apparatus 10' extends beyond the longitudinal length L of the fire apparatus 10 a distance Δ'. The distance Δ' may be approximately the same as the amount of the body 110 rearward of the tandem rear axles 18 of the fire apparatus 10 such that the amount of body rearward of the tandem rear axle of the fire apparatus 10' is approximately double that of the fire apparatus 10. Decreasing the amount of the body 110 rearward of the tandem rear axles 18 improves drivability and maneuverability, and substantially reduces the amount of damage that fire departments may inflict on public and/or private property throughout a year of operating their fire trucks.

One solution to reducing the overall length of a fire truck is to configure the fire truck as a rear-mount fire truck with the ladder assembly overhanging the front cabin (e.g., in order to provide a ladder assembly with comparable extension capabilities, etc.). As shown in FIG. 9, the longitudinal length L of the fire apparatus 10 is compared to the longitudinal length L' of a traditional rear-mount fire apparatus 10". As shown in FIG. 9, when the front axles of the fire apparatus 10 and the fire apparatus 10" are aligned, the ladder assembly of the fire apparatus 10" extends beyond the longitudinal length L of the fire apparatus 10 a distance Δ" such that the ladder assembly overhangs past the front cabin. Overhanging the ladder assembly reduces driver visibility, as well as rear-mount fire trucks do not provide as much freedom when arriving at a scene on where and how to position the truck, which typically requires the truck to be reversed into position to provide the desired amount of reach (e.g., which wastes valuable time, etc.). Further, the height H" of the fire apparatus 10" is required to be higher than the height H of the fire apparatus 10 (e.g., by approximately one foot, etc.) so that the ladder assembly of the fire apparatus 10" can clear the front cabin thereof.

Work Platform and Repositionable Console

Referring to FIGS. 17 and 18, the side ladder 132 is used to access the work platform 550. The side ladder 132 includes a series of steps 552 fixedly coupled to a pair of side plates 554. As shown, the side ladder 132 includes four steps 552. In other embodiments (e.g., the embodiment shown in FIG. 22B), the side ladder 132 includes more or fewer steps 552. The side plates 554 are spaced apart, and the steps 552 extend between the side plates 554. A first pair of linkages, shown as upper links 556, and a second pair of links, shown as lower links 558, are each pivotably coupled to the side plates 554 at a first end. As shown in FIG. 19, the body 110 defines a recess 560 that receives the side ladder 132. A second end of each of the upper links 556 and the lower links 558 is pivotably coupled to the body 110 along an inner surface of the recess 560. Accordingly, the side ladder 132 is hingedly coupled to the body 110 through the upper links 556 and the lower links 558.

Figure 22A:
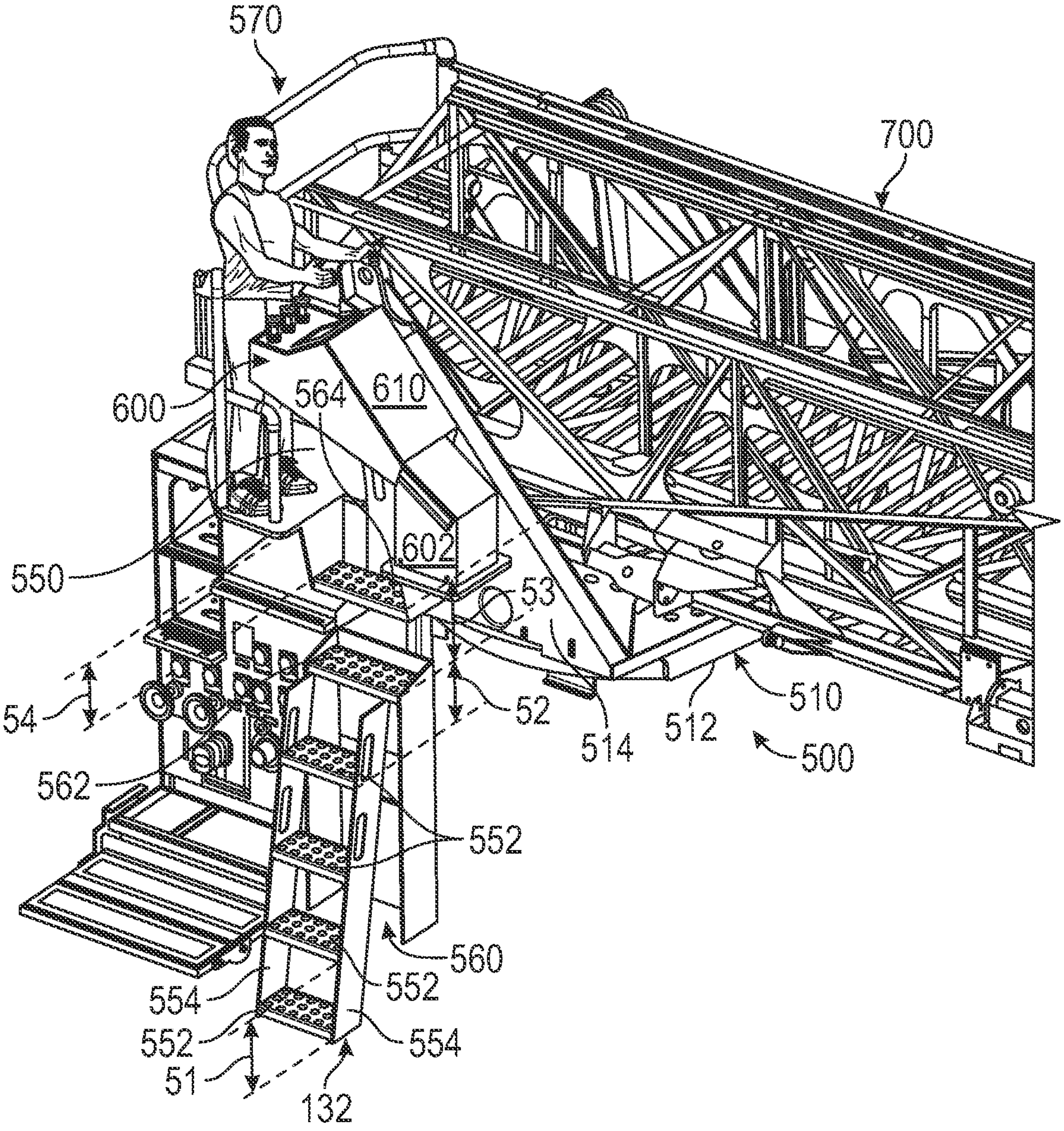
FIG. 22A is a perspective view of a side ladder of the mid-mount fire apparatus of FIG. 1 in a deployed position and an aerial assembly of the mid-mount fire apparatus of FIG. 1, according to an exemplary embodiment.
Figure 22B:
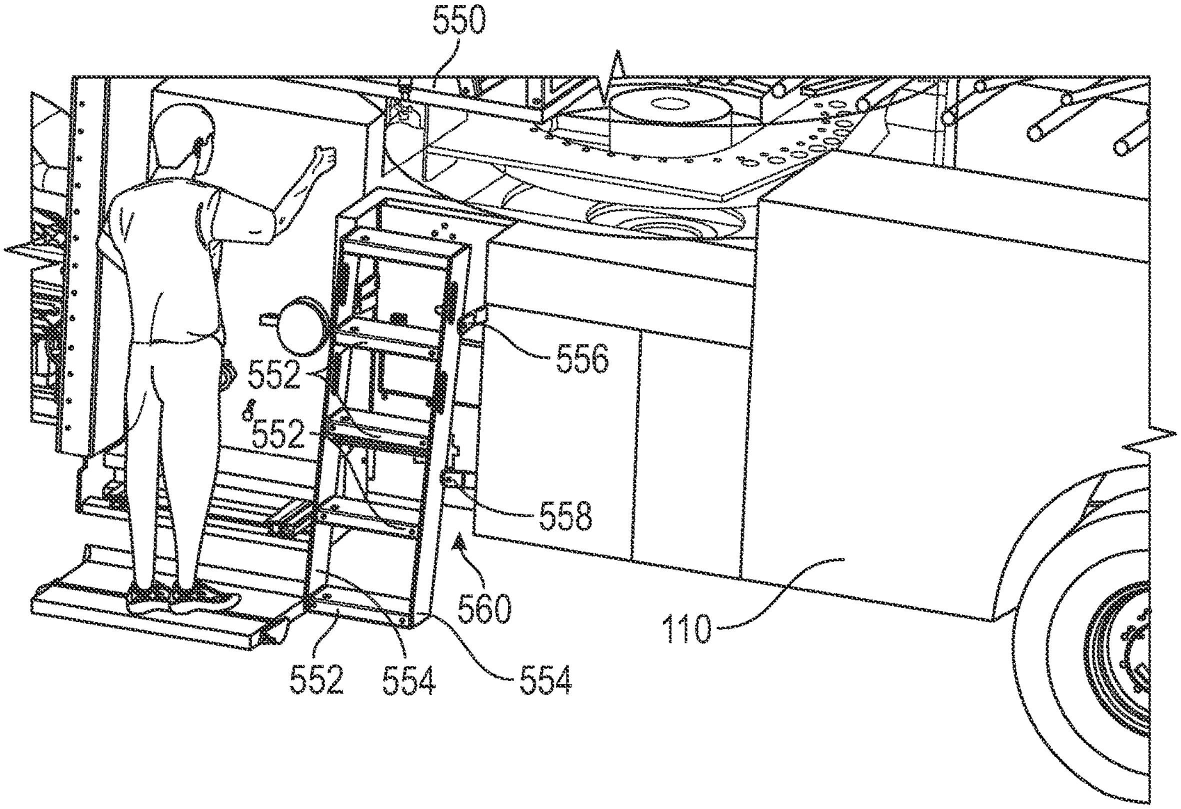
FIG. 22B is a perspective view of a side ladder of the mid-mount fire apparatus of FIG. 1 in a deployed position, according to another exemplary embodiment.

When the side ladder 132 is in the stowed position, shown in FIGS. 17 and 18, the side ladder 132 is located fully within the recess 560. In one embodiment, this configuration of the side ladder 132 prevents the side ladder 132 from enlarging the overall size of the fire apparatus 10. When the side ladder 132 is in the stowed position, the upper links 556 and the lower links 558 are in a substantially vertical orientation. FIGS. 22A and 22B show the side ladder 132 in the deployed position, according to various exemplary embodiments. To move the side ladder 132 from the stowed position to the deployed position, an operator can apply a downward force onto the side ladder 132. In some embodiments, the side ladder 132 includes a lock that selectively limits or prevents movement of the side ladder 132 relative to the body 110 to prevent inadvertent deployment of the side ladder 132. The downward force causes the upper links 556 and the lower links 558 to rotate downward and laterally outward, moving the side ladder 132 downward and laterally outward from a longitudinal centerline of the fire apparatus 10. The upper links 556 are shorter than the lower links 558. Accordingly, as shown in FIG. 22B, the lower end portion of the side ladder 132 rotates out farther laterally than the upper end portion of the side ladder 132. In this orientation, the steps 552 near the bottom of the side ladder 132 are positioned farther outward laterally than the steps 552 near the top of the side ladder 132. This facilitates a more natural climbing of the side ladder 132 than an orientation in which the steps 552 are positioned directly above one another with no lateral offset. When in the deployed position, the side ladder 132 is supported by one or more of the ground surface, the upper links 556, and the lower links 558.

Directly above the side ladder 132 is a step 562 that facilitates an operator moving between the side ladder 132 and the turntable 510. The step 562 is fixedly coupled to the body 110. Accordingly, the step 562 remains in place regardless of the position of the turntable 510 or the side ladder 132. At least a portion of the step 562 is longitudinally aligned with the steps 552. In some embodiments, the step 562 extends farther longitudinally forward or rearward than the steps 552.

Referring to FIGS. 17, 18, 23, and 24, the aerial assembly 500 includes a step 564 that is coupled to the turntable 510 (e.g., directly to one of the side supports 514, indirectly through the work platform 550 and the pedestal 602). Accordingly, the step 564 rotates with the turntable 510. The turntable 510 and aerial ladder assembly 700 are selectively rotatable into a storage configuration (e.g., a transport position and orientation, a storage position and orientation, etc.) in which the aerial ladder assembly 700 is in the retracted configuration and extends rearward and parallel to the longitudinal axis 14. The turntable 510 and aerial ladder assembly 700 may be moved to the storage orientation in preparation for transport (e.g., driving down a road). When the turntable 510 is in the storage orientation, the step 564 is aligned with the side ladder 132 such that an operator can climb from the steps 552 onto the step 562 and the step 564. A top surface of the step 564 (e.g., the surface that engages and supports the operator) is positioned below a top surface of the work platform 550 (e.g., the surface that engages and supports the operator). When the turntable 510 is in the storage configuration, the step 564 is positioned longitudinally rearward of the work platform 550.

Referring to FIGS. 17 and 22A, the top surfaces of each of the steps 552 (e.g., the surfaces that engage and support the operator) are each vertically offset from one another by a first vertical distance, shown as step height S1. When the side ladder 132 is in the deployed position, the top surface of the step 552 at the top of the side ladder 132 is vertically offset below the top surface of the step 562 by a second vertical distance, shown as step height S2. When the side ladder 132 is in the stowed position, the top surface of the step 552 at the top of the side ladder 132 may be vertically offset from the top surface of the step 562 by a distance that is less than the step height S2. The top surface of the step 564 is vertically offset above the top surface of the step 562 by a third vertical distance, shown as step height S3. The top surface of the work platform 550 is vertically offset above the top surface of the step 564 by a fourth vertical distance, shown as step height S4. With the aerial ladder assembly 700 in the storage configuration, the top surface of the lower middle section 900 configured to support the feet of an operator (e.g., the top surface of the rungs of the lower middle section 900) is offset above the top surface of the work platform 550 by a fifth vertical distance, shown as step height S5. One or more of step height S1, step height S2, step height S3, step height S4, and step height S5 may be substantially equal to facilitate intuitive placement of an operator's feet when climbing or descending the steps, the work platform 550, and the aerial ladder assembly 700.

To access or descend from the work platform 550 from the ground surface, the turntable 510 is rotated to the storage configuration, and the side ladder 132 is moved to the deployed position. In other embodiments, the steps 552 are fixed to the body 110, and the steps 552 are used without first deploying the side ladder 132. To access the work platform 550, an operator can climb up the steps 552, onto the step 562, and onto the step 564 without turning. Once standing on the step 564, the operator can rotate until they are facing longitudinally forward and step up onto the work platform 550. Such a path is referred to herein as a platform access path. A similar process can be followed in reverse to descend form the work platform 550. Other platform access paths may be available to the operator. By way of example, the fire apparatus may include a side ladder 132 on each lateral side of the body 110. In one such embodiment, the step 564 aligns with a side ladder 132 both when the turntable 510 is in the storage configuration and when the turntable 510 is rotated 180 degrees from the storage orientation. Alternatively, when the turntable 510 is rotated to an orientation that is not the storage configuration (e.g., the orientation shown in FIG. 24), an operator may climb directly from a top surface of the body 110 onto the step 564.

Figure 23:
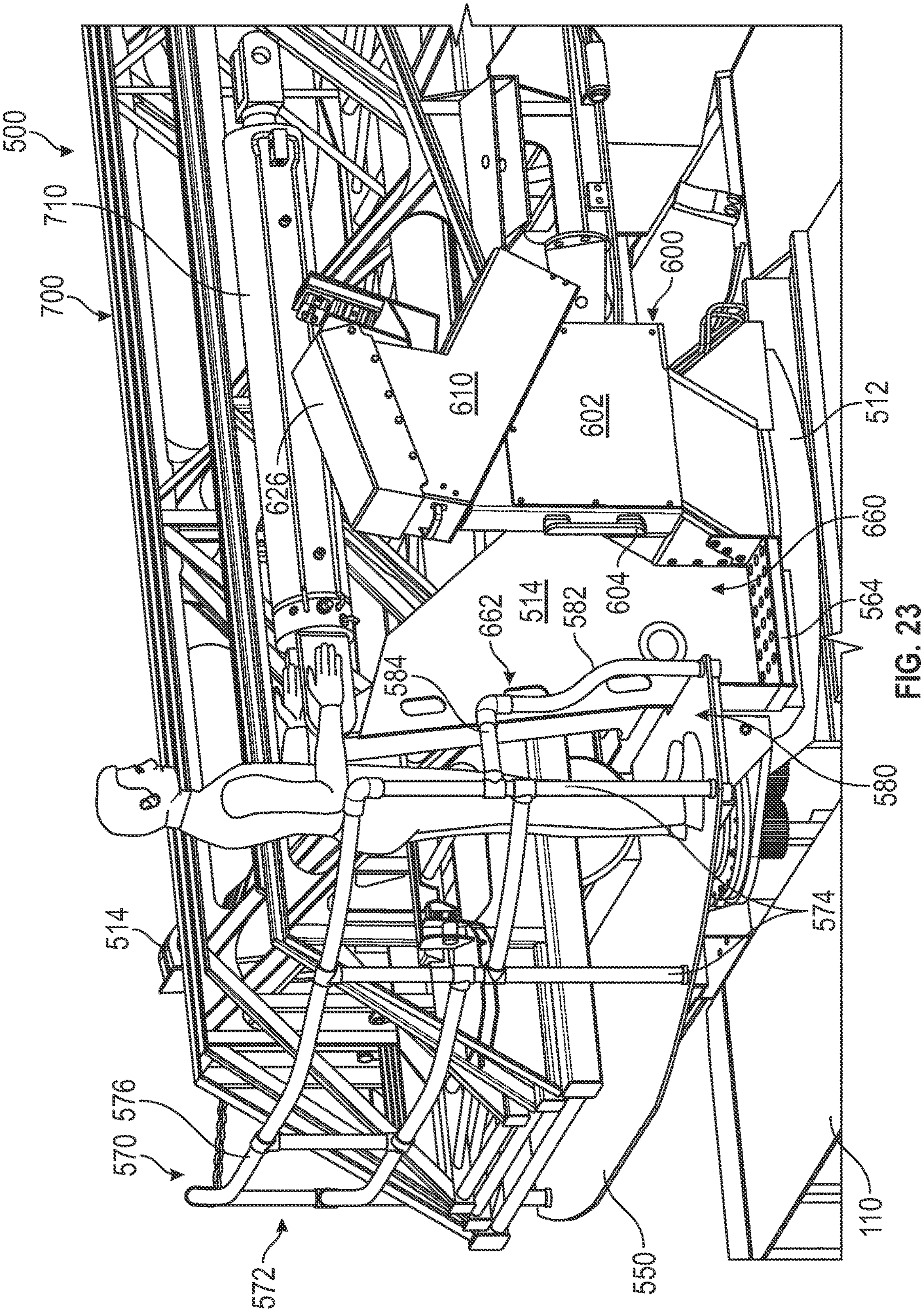
FIG. 23 is a perspective view of an aerial assembly of the mid-mount fire apparatus of FIG. 1, according to another exemplary embodiment.
Figure 24:
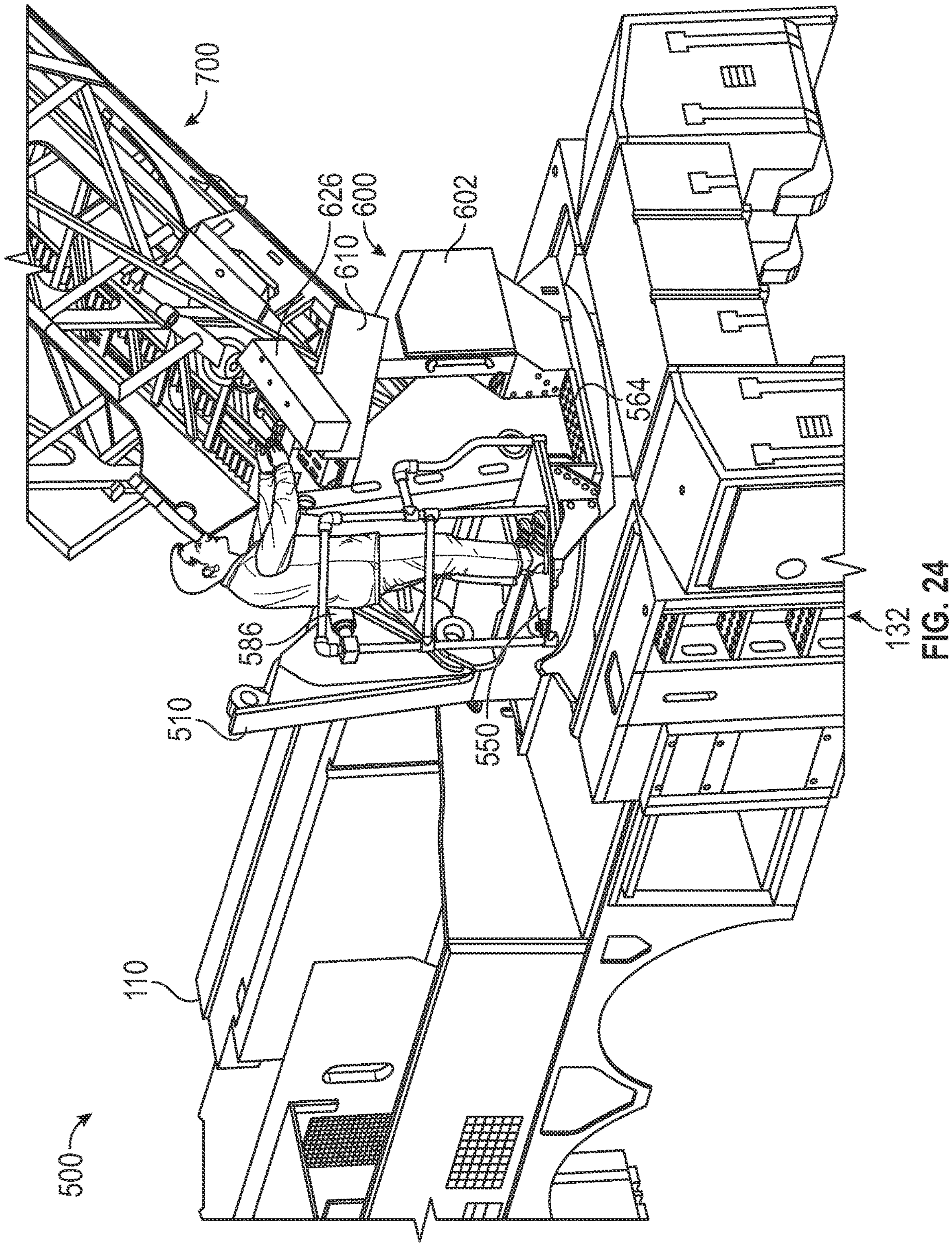
FIG. 24 is a perspective view of an aerial assembly of the mid-mount fire apparatus of FIG. 1, according to another exemplary embodiment.

Referring to FIGS. 23 and 24, the work platform 550 is configured to support one or more operators standing on a top surface of the work platform 550. The work platform 550 extends adjacent the aerial ladder assembly 700 to facilitate access to the aerial ladder assembly 700. The size of the work platform 550 varies between different embodiments. In the embodiment shown in FIG. 23, the work platform 550 extends across the full width of the aerial assembly 500 such that the over-retracted portions of the aerial ladder assembly 700 extend directly above the work platform 550. In the embodiment shown in FIG. 24, the work platform 550 is positioned laterally offset from the over-retracted portions of the aerial ladder assembly 700. In operation, one or more operators can climb from the work platform 550 onto the aerial ladder assembly 700. The operators may climb onto the base section 800, the lower middle section 900, the middle section 1000, the upper middle section 1100, or the fly section 1200 from the work platform 550, depending upon the degree to which the aerial ladder assembly 700 is extended. As shown in FIG. 24, the work platform 550 provides access to the aerial ladder assembly 700 even when the aerial ladder assembly 700 is raised.

Figure 25:
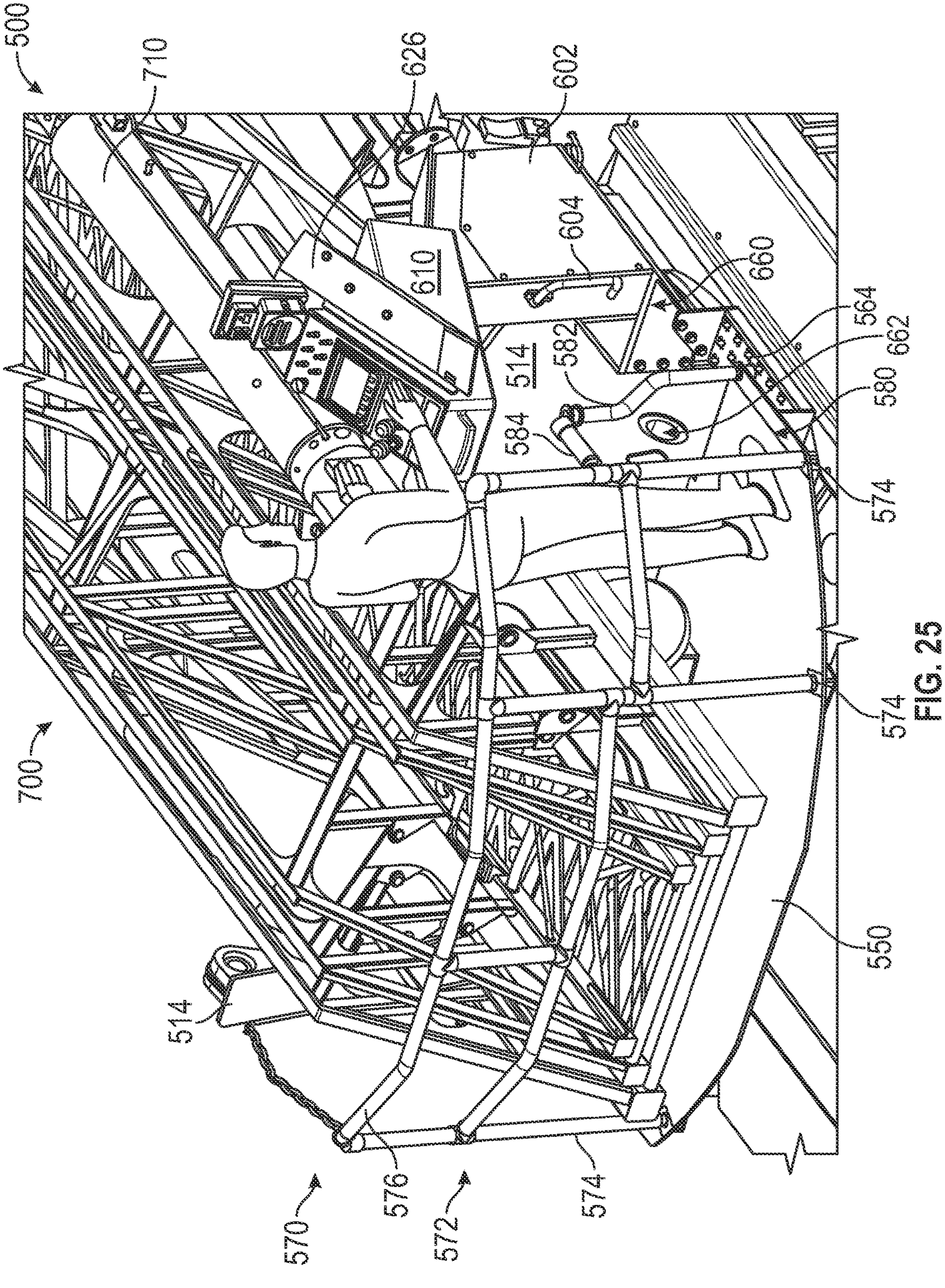
FIG. 25 is another perspective view of the aerial assembly of FIG. 23.

Referring to FIGS. 23 and 25, a railing or guide rail, shown as guard rail 570, is coupled to the work platform 550. The guard rail 570 extends along an outer perimeter of the work platform 550 (e.g., the edge of the work platform 550 positioned furthest from the vertical pivot axis 40). The guard rail 570 facilitates containing operators and equipment on top of the work platform 550, as well as providing support to operators standing on the work platform 550. A first section 572 of the guard rail 570 includes support members, shown as vertical members 574, and a top rail 576. The vertical members 574 are coupled to and extend vertically upward from the work platform 550. The top rail 576 extends substantially horizontally between the top ends of the vertical members 574. The top rail 576 is coupled to each of the vertical members 574. Additional members may extend between the vertical members 574 and the top rail 576 to prevent operators or equipment from passing off of the work platform 550 between the vertical members 574 and the top rail 576. A second section 580 of the guard rail 570 includes a support member, shown as climbing rail 582, and a top rail 584. The climbing rail 582 is coupled to and extends upward from the work platform 550. The top rail 584 extends between and is coupled to the top end of the climbing rail 582 and one of the vertical members 574. The climbing rail 582 extends adjacent the step 564. Accordingly, the climbing rail 582 and the top rail 584 can be held by an operator to support themselves when traveling along the platform access path. The climbing rail 582 is shorter than the vertical members 574 such that the top surface of the top rail 584 is positioned vertically below the top surface of the top rail 576. This places the top rail 584 in an easier position to access when transitioning between the step 562, the step 564, and the work platform 550. The climbing rail 582 is bent partway along its length such that the top end portion of the climbing rail 582 is positioned longitudinally forward of the bottom end portion.

Figure 26:
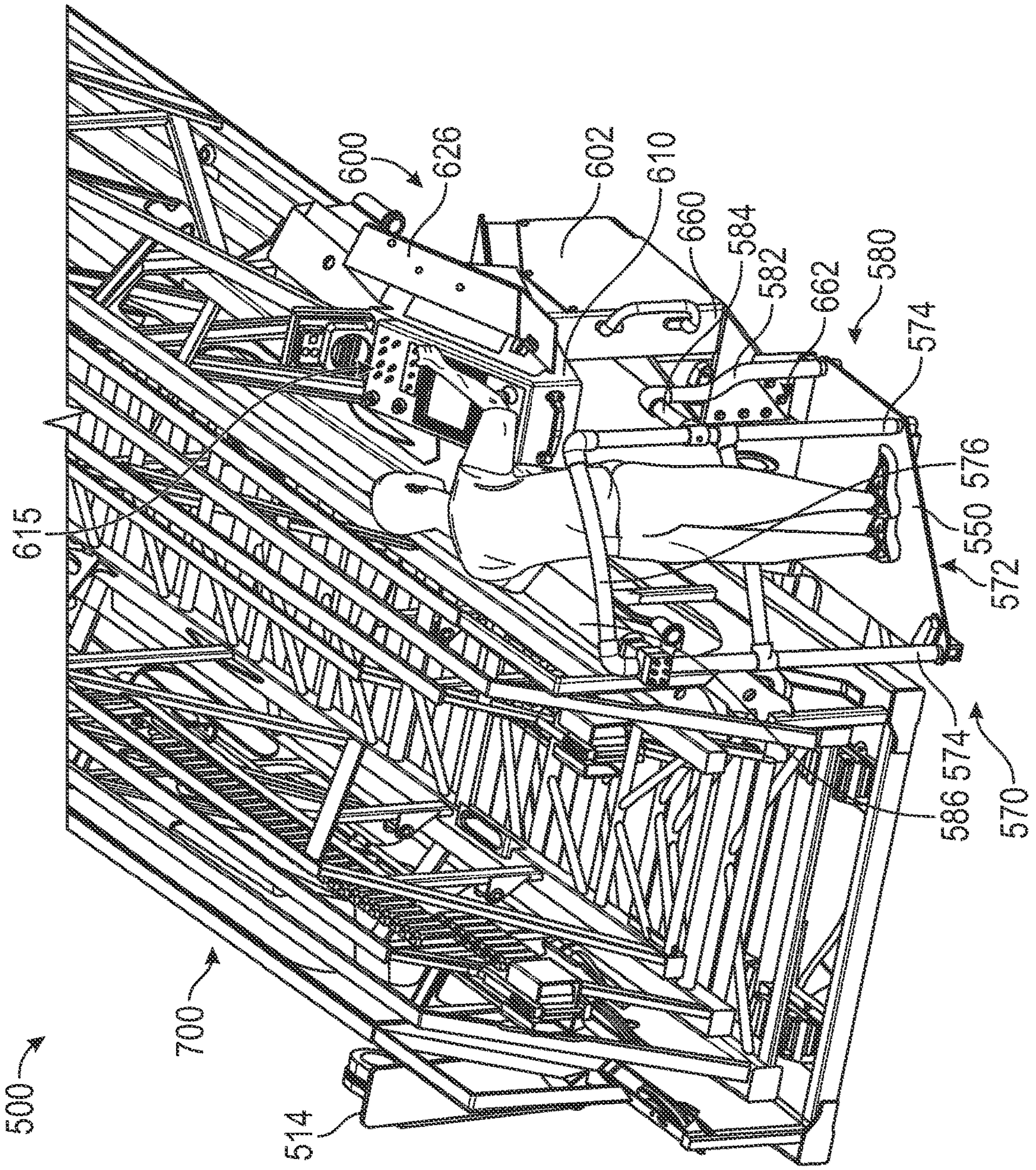
FIG. 26 is another perspective view of the aerial assembly of FIG. 24.
Figure 27:
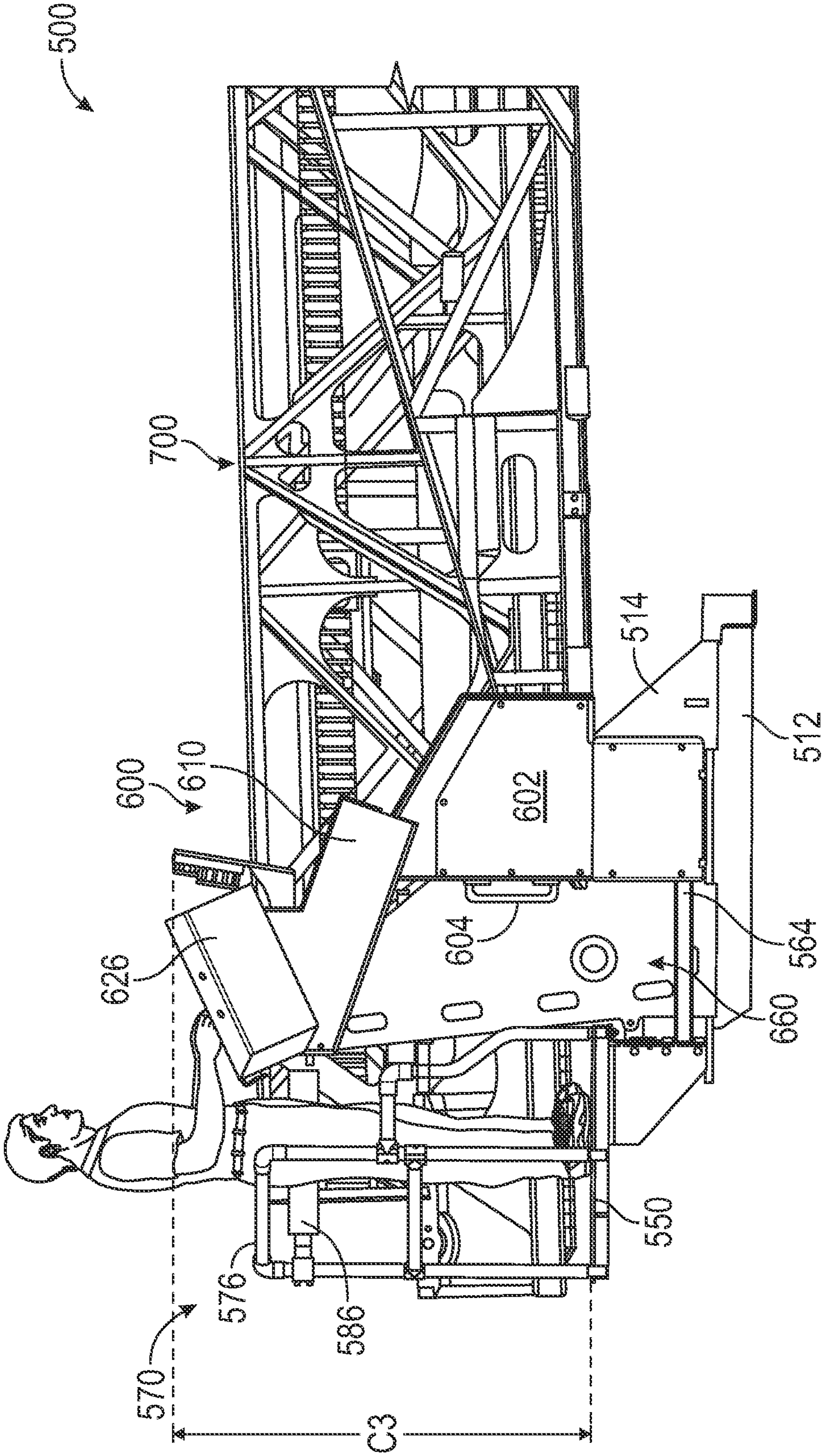
FIG. 27 is a side view of the aerial assembly of FIG. 24.

In the embodiment shown in FIGS. 24, 26, and 27, the top rail 576 is shortened and one of the vertical members 574 is omitted relative to the embodiment shown in FIG. 25 to accommodate the size of the work platform 550. The guard rail 570 further includes a movable section, shown as gate 586. The gate 586 is coupled to one of the vertical members 574 and extends between that vertical member 574 and one of the side supports 514. The gate 586 may be selectively be rotated (e.g., upward, outward, etc.) from a blocking position, shown in FIGS. 24, 26, and 27, to an open position. In the blocking position, the gate 586 inhibits inadvertent movement of an operator from the work platform 550 toward the aerial ladder assembly 700. In the open position, the gate 586 does not inhibit movement of the operator.

Figure 28:
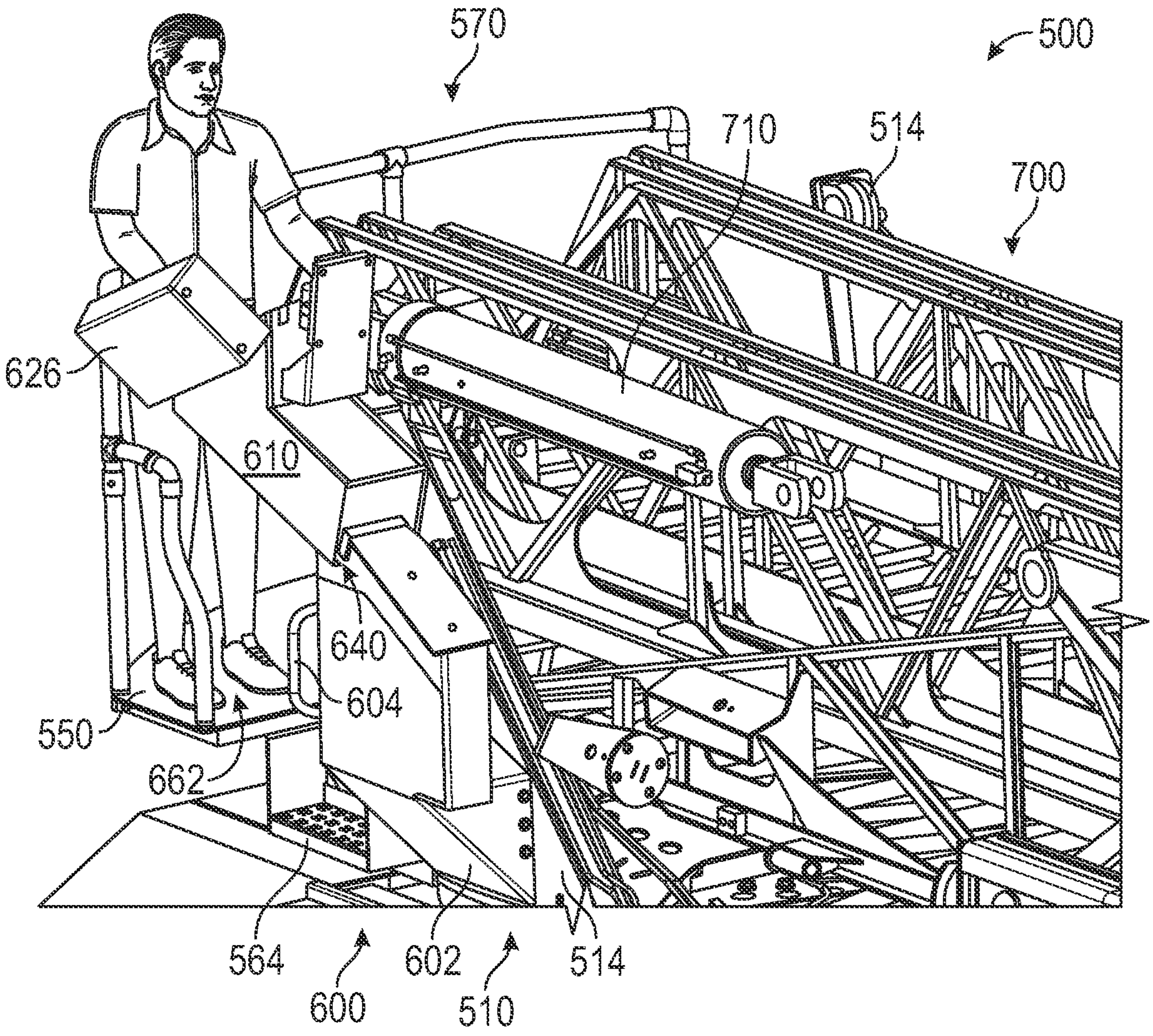
FIG. 28 is another perspective view of the aerial assembly of FIG. 23.

Referring to FIGS. 23, 27, and 28, the control console 600 includes a first section, base section, or fixed section, shown as pedestal 602. The pedestal 602 is fixedly coupled to the turntable 510. Specifically, the pedestal 602 is coupled to a side of one of the side supports 514 and extends vertically upward and laterally outward therefrom. The pedestal 602 is positioned on the side of the step 564 opposite the work platform 550 such that the step 564 extends between the pedestal 602 and the work platform 550. The pedestal 602 is positioned longitudinally rearward of the work platform 550 and the step 564. The pedestal 602 is coupled to a handle 604 that an operator can use to support themselves when ascending and descending the steps. The pedestal 602 may house one or more control system components, such as valves, pumps, controllers, electrical circuits, etc.

The control console 600 further includes a second section, upper section, or movable section, shown as interface section 610. In one embodiment, the interface section 610 is movably (e.g., slidably, etc.) coupled to the pedestal 602 such that the interface section 610 is selectively repositionable between a stored or stowed position (e.g., as shown in FIG. 23) and a use or operating position (e.g., as shown in FIGS. 27 and 28). The interface section 610 may be movably coupled to the pedestal 602 and/or another component of the fire apparatus 10 with a slide, a hinge, an arm, a plurality of linkages, or another mechanical and/or electrical arrangement, according to various embodiments. In the operating position, the interface section 610 is accessible by an operator to facilitate control over various components of the aerial assembly 500 and/or other systems of the fire apparatus 10. In one embodiment, the interface section 610 is additionally or alternatively operable in the stowed position to facilitate control over various components of the aerial assembly 500 and/or other systems of the fire apparatus 10. In the stowed position, the interface section 610 is moved to a position that facilitates movement of an operator along the platform access path.

Figure 29:
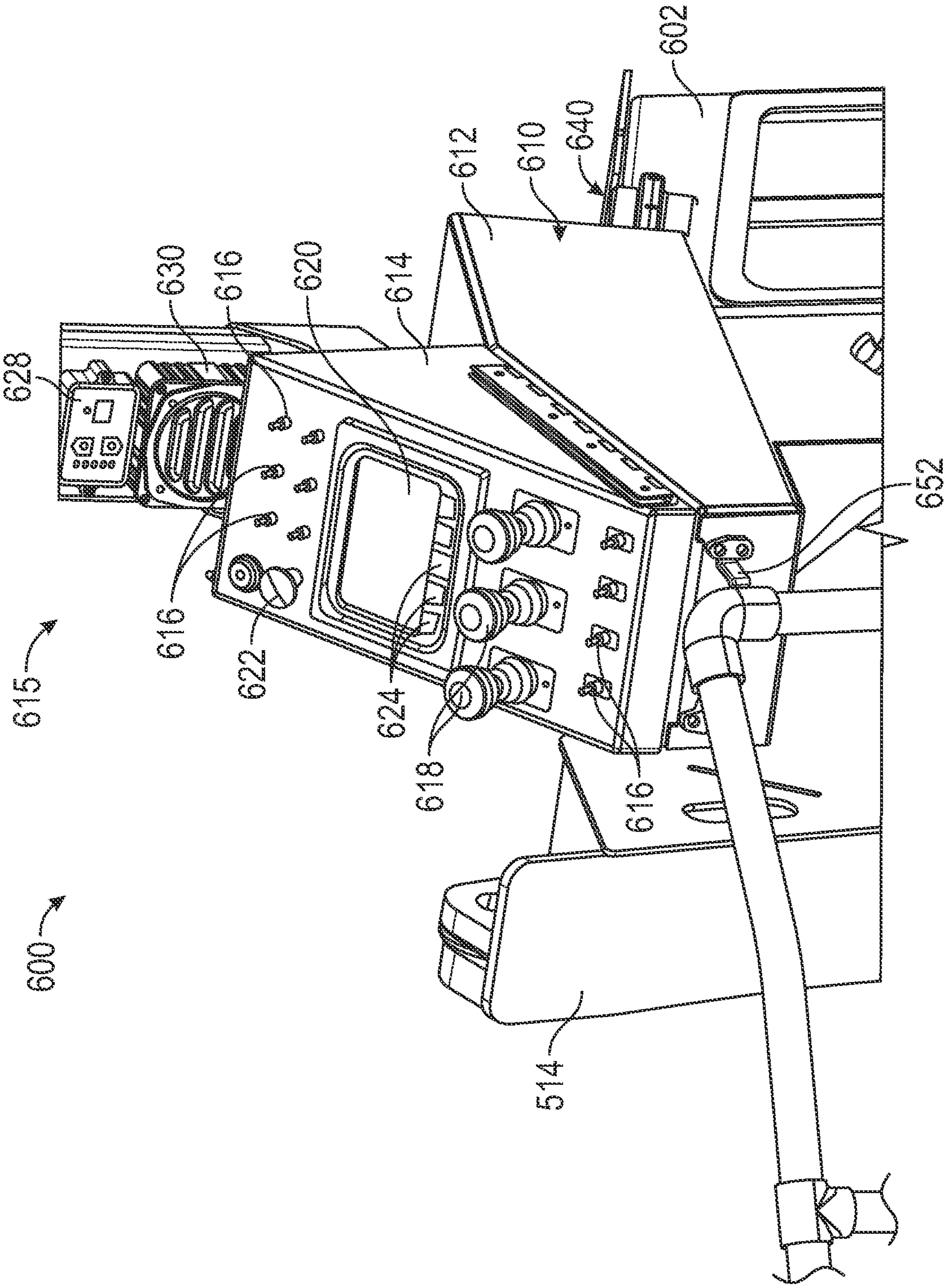
FIG. 29 is a perspective view of a control console of an aerial assembly of the mid-mount fire apparatus of FIG. 1 in an operating position, according to an exemplary embodiment.

Referring to FIG. 29, the interface section 610 includes a first section, shown as base section 612, and a second section, shown as inclined section 614. The inclined section 614 may be hingedly coupled to the base section 612. The inclined section 614 includes an inclined surface that is angled relative to a horizontal plane to facilitate an operator viewing and interacting with parts of an operator interface 615 arranged on the inclined surface. Alternatively, the base section 612 and the inclined section 614 may be a single component.

The interface section 610 includes the operator interface 615, which provides a variety of control components that are configured to receive commands from an operator and/or provide information to the operator. The inclined surface of the interface section 610 supports switches 616, joysticks 618, a display, shown as screen 620, and a button, shown as emergency stop button 622. The switches 616 may be used to turn various components on or off, such as pumps and valves that control flows of fluid (e.g., water, fire suppressant foam, etc.) or lights (e.g., spotlights, etc.). The joysticks 618 may be used to control actuators that drive rotation of the turntable 510, aerial ladder assembly 700, and/or the work basket 1300 (e.g., the rotation actuator 320, the pivot actuators 710, etc.) or extension of the aerial ladder assembly 700 (e.g., the extension actuator 720). Additionally or alternatively, the joysticks 618 may be used to control actuation of other parts of the fire apparatus 10, such as driving the wheel and tire assemblies 30 to propel the fire apparatus 10. The screen 620 may provide information (e.g., water levels, fuel levels, a loading of the work basket 1300, etc.) to the operator visually. The screen 620 may be a touchscreen configured to receive user inputs (e.g., through a graphical operator interface. Additionally or alternatively, the screen 620 may include buttons 624 that facilitate issuing commands. The emergency stop button 622 may be configured to disable one or more systems of the fire apparatus 10 when engaged. As shown in FIG. 26, the interface section 610 includes a cover 626 hingedly coupled to the inclined section 614. The cover 626 is configured to selectively prevent access to the switches 616, the joysticks 618, the screen 620, and the emergency stop button 622 when the operator interface 615 is not in use. The cover 626 may be manually rotated away from the operator interface 615 to access the operator interface 615.

The operator interface 615 further includes a communication interface 628 and a speaker 630. Together with another similar arrangement located elsewhere, the communication interface 628 and the speaker 630 are configured to facilitate communication with other operators in other areas of the fire apparatus 10 (e.g., in the work basket 1300, in the front cabin 20, etc.) and/or surrounding the fire apparatus 10. By way of example, the communication interface 628 may work as a push-to-talk interface including a button that, when engaged, causes a microphone to record the operator's voice. The communication interface 628 may then broadcast the operator's voice recording to speakers mounted elsewhere in the fire apparatus 10 or carried by other operators. Likewise, the communication interface 628 may receive voice recordings from other operators and play those recordings through the speaker 630. In other embodiments, the interface section 610 includes other types of control components.

Figure 30:
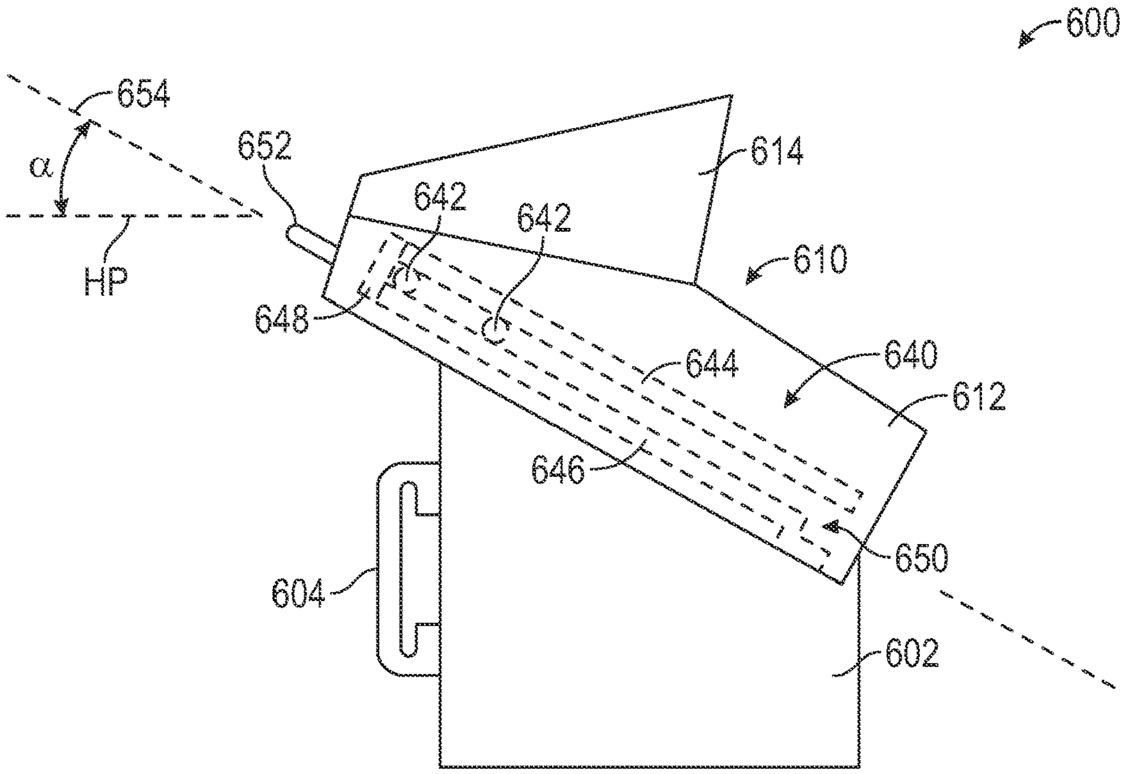
FIG. 30 is a side view of the control console of FIG. 29 in a stowed position.
Figure 31:
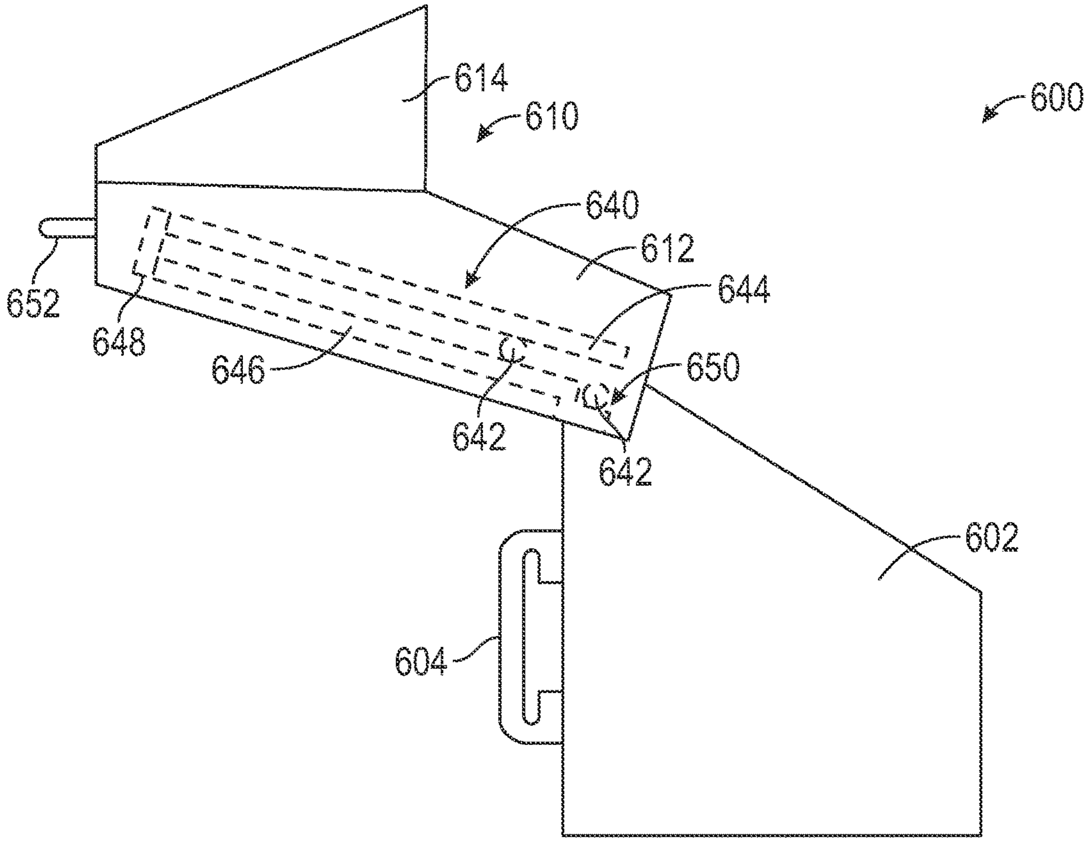
FIG. 31 is a side view of the control console of FIG. 29 in the operating position.

Referring to FIGS. 30 and 31, the control console 600 includes a guide assembly 640 that slidably couples the interface section 610 to the pedestal 602. The control console 600 may include two of the guide assemblies 640, one on each lateral side of the pedestal 602. The guide assembly 640 is configured to slidably couple the interface section 610 to the pedestal 602. The guide assembly 640 includes a pair of bearings 642 rotatably coupled to the pedestal 602. The bearings 642 are received between a first guide member, shown as top guide 644, a second guide member, shown as bottom guide 646, and a third guide member, shown as stop 648. The bearings 642 slide freely between the top guide 644 and the bottom guide 646, facilitating sliding motion of the interface section 610. The top guide 644 and the bottom guide 646 are arranged parallel to one another and offset from another by the diameter of the bearings 642. This constrains the interface section 610 to purely linear motion until one of the bearings 642 contacts the stop 648 or is received within a recess 650. The interface section 610 includes a handle 652 that an operator may pull to control movement of the interface section 610. The control console 600 may further include a biasing element (e.g., an extension spring, a gas spring, etc.) to bias the interface section 610 in a biasing direction (e.g., to oppose gravity).

FIG. 30 illustrates the interface section 610 in the stowed position, and FIG. 31 illustrates the interface section 610 in the operating position. The operating position of the interface section 610 is located longitudinally forward and vertically above stowed position of the interface section 610. In the stowed position, one of the bearings 642 engages the stop 648, limiting or preventing movement of the interface section 610 in all but one direction (i.e., toward the operating position). Between the stowed and operating positions, the guide assemblies 640 constrain movement of the interface section 610 along an axis of extension 654. The axis of extension 654 is oriented at an angle $\alpha$ relative to a horizontal plane HP. The angle $\alpha$ is between 0 and 90 degrees such that the interface section 610 moves both longitudinally and vertically. As the interface section 610 approaches the operating position, one of the bearings 642 moves into the recess 650. The recess 650 increases the distance between the top guide 644 and the bottom guide 646, allowing the interface section 610 to rotate downward. As the bearing 642 moves into the recess 650, the bearing 642 rides against a wall of the recess 650 defined by the bottom guide 646. This wall supports the weight of the interface section 610, limiting or preventing the interface section 610 from moving back toward the stowed position due to the force of gravity. To move the interface section 610 back toward the stowed position, an operator can apply a lifting force on the handle 652 to rotate the bearings 642 out of the recess 650.

In other embodiments, the interface section 610 is otherwise movably coupled to the pedestal 602. By way of example, the interface section 610 may be pivotably coupled to the pedestal 602. In such an embodiment, the interface section 610 may rotate about a lateral axis positioned near the front end of the pedestal 602. In the stowed position, the interface section 610 may rest on the pedestal 602. In the operating position, the interface section 610 may be rotated upward and toward the work platform 550, rotating approximately 180 degrees to face the operator. By way of another example, the pedestal 602 may be positioned on or adjacent the work platform 550. In such an embodiment, the interface section 610 may not have to move horizontally to be reached by the operator. However, the interface section 610 may move vertically between a stowed position where the interface section 610 does not increase the height H of the fire apparatus 10 and an operating position where the interface section 610 is a comfortable height for the operator to access the operator interface 615. In such an example, the interface section 610 may be slidably coupled to the pedestal 602 such that the interface section 610 moves purely vertically.

Figure 32:
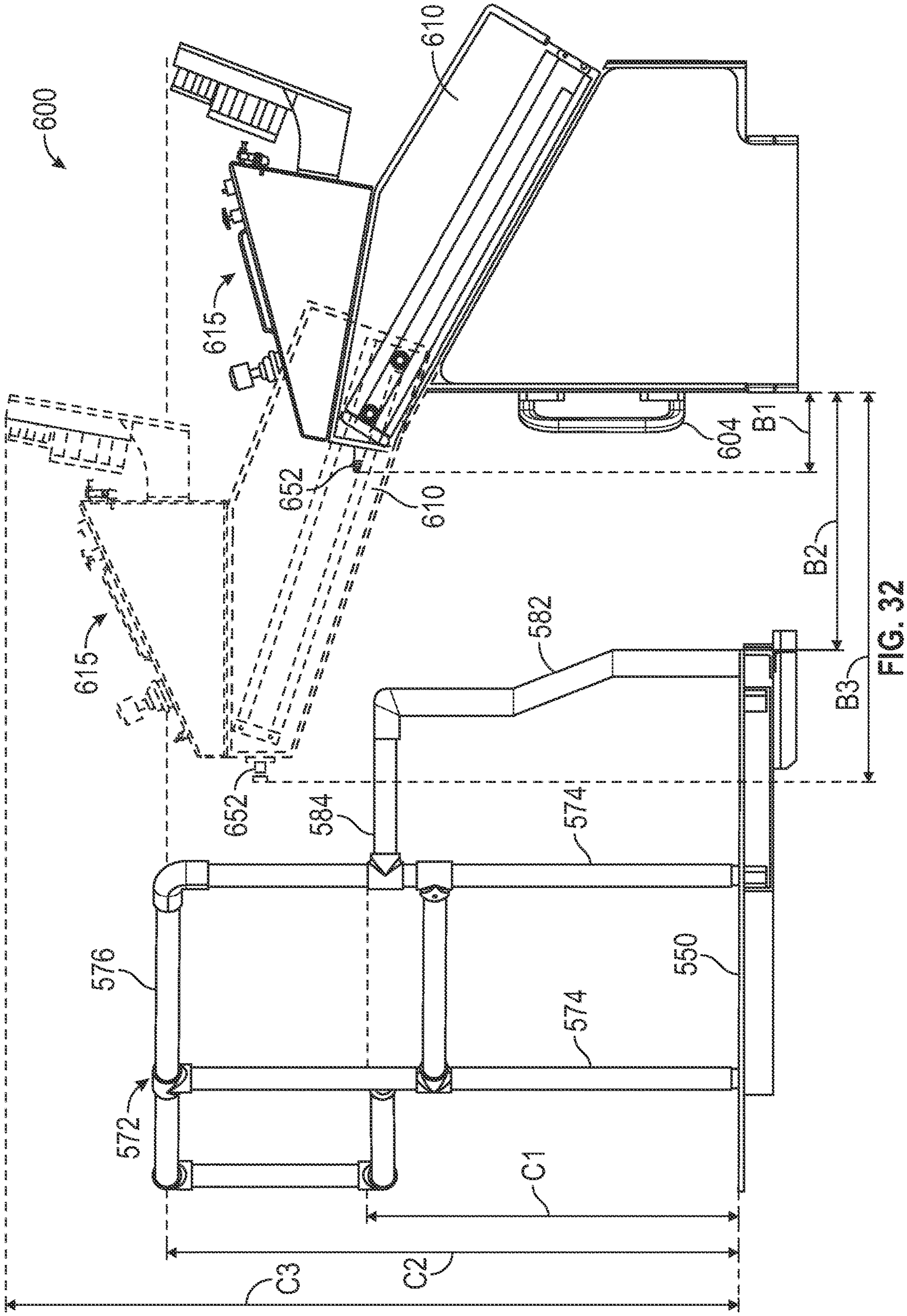
FIG. 32 is a side view of the control console of FIG. 29 in both the stowed position and the operating position.

FIG. 32 shows the interface section 610 in both the operating position (e.g., in dashed lines) and the stowed position (e.g., in solid lines). In the stowed position, the interface section 610 extends a first horizontal distance B1 away from the pedestal 602. The work platform 550 is separated from the pedestal 602 by a second horizontal distance B2. The horizontal distance B2 is greater than the horizontal distance B1 such that the control console 600 is offset from the work platform 550. In the operating position, the interface section 610 extends a third horizontal distance B3 away from the pedestal 602. The horizontal distance B3 is greater than the horizontal distance B2 such that the interface section 610 extends directly above the work platform 550 in the operating position. The horizontal distance B1 and the horizontal distance B3 are defined by the handle 652.

The top surface of the top rail 584 extends a first vertical distance C1 above the work platform 550. In the stowed position, the interface section 610 extends a second vertical distance C2 away from the work platform 550. The vertical distance C2 is greater than the vertical distance C1 such that the interface section 610 extends above the second section 580 of the railing 570 in all configurations. The top rail 576 extends slightly above the vertical distance C2. In other embodiments, the top rail 576 extends a vertical distance above the work platform 550 that is substantially equal to or slightly less than the vertical distance C2. In the operating position, the interface section 610 extends a third vertical distance C3 away from the work platform 550. The vertical distance C3 is greater than the vertical distance C2 such that the interface section 610 extends above the first section 572 of the guard rail 570 in the operating position. As shown in FIG. 27, the interface section 610 extends above the aerial ladder assembly 700 when the aerial ladder assembly 700 is in the storage configuration. Accordingly, the interface section 610 may define the highest (i.e., farthest from the ground surface) point of the vehicle when the interface section 610 is in the operating position and the aerial ladder assembly 700 is in the storage configuration.

Referring to FIGS. 23 and 25, a first passage, shown as access opening 660, is defined between the climbing rail 582 of the guard rail 570 and the pedestal 602. The access opening 660 extends directly above the step 564. A second passage, shown as access opening 662, is defined between the climbing rail 582 and one of the side supports 514. The platform access path passes through both the access opening 660 and the access opening 662. As shown in FIG. 23, when the interface section 610 is in the stowed position, both the access opening 660 and the access opening 662 are unobstructed, facilitating passage of an operator along the platform access path through the access opening 660 and the access opening 662 uninhibited. As shown in FIGS. 26 and 27, when the interface section 610 is in the operating position, the interface section 610 extends across the entirety of the access opening 660 and across a portion of the access opening 662, inhibiting movement of the operator along the platform access path. While it may still be possible to pass along the platform access path with the interface section 610 in the operating position, an operator passing along the platform access path would be required to crouch, duck, or otherwise contort themselves to avoid the interface section 610.

In operation, the fire apparatus 10 would arrive at the scene of an emergency with the turntable 510 and the aerial ladder assembly 700 in the storage configuration, the interface section 610 in the stowed position, and the side ladder 132 in the stowed position. To access the work platform 550, an operator would pull the side ladder 132 into the operating position. The operator could then pass along the platform access path: scaling the steps 552 and the step 562, passing through the access opening 660, scaling the step the step 564, passing through the access opening 662, and scaling the work platform 550. Once standing on the work platform 550, the operator could exert a pulling force on the handle 652, moving the interface section 610 of the control console 600 forward and upward until the interface section 610 rotates downward, signifying entry of the bearing 642 into the recess 650. The operator could then open the cover 626 and begin using the various controls provided by the operator interface 615. The operator may actuate the various portions of the aerial assembly 500 or perform a variety of other functions using the operator interface 615. A similar process may be followed in reverse to move from the work platform 550 to the ground surface. If other operators require access the work platform 550 (e.g., to access the aerial ladder assembly 700) during operation, the operator may rotate the turntable 510 back to the storage configuration and temporarily move the interface section 610 to the stowed position to again facilitate uninhibited access to the work platform 550. To move the interface section 610 to the stowed position, the operator may lift up on the handle 652 and allow the interface section 610 to translate back toward the stowed position.

Figure 33:
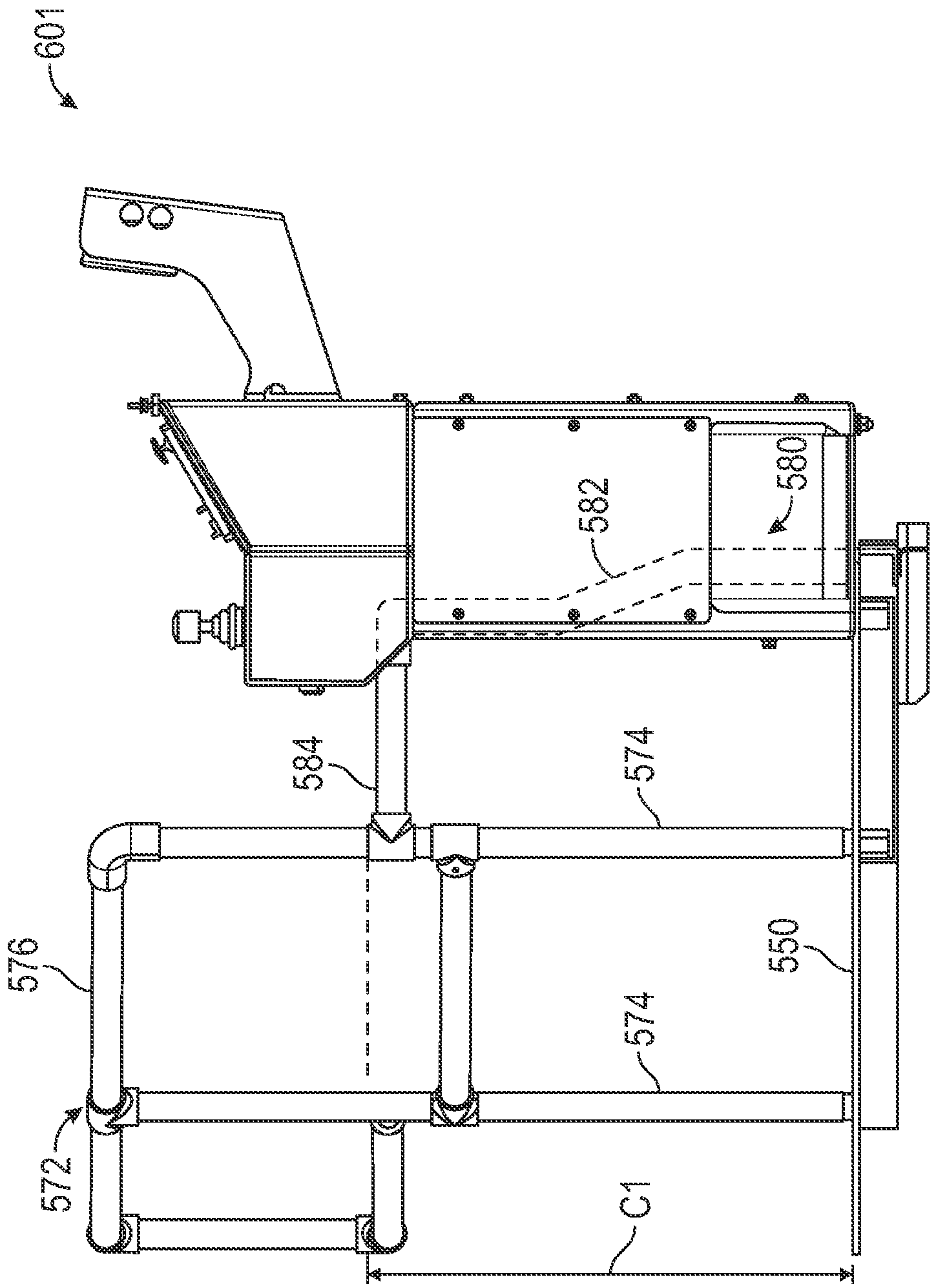
FIG. 33 is a side view of a fixed control console, according to an exemplary embodiment.

Other operator consoles are fixed in position relative to the turntable of a fire apparatus. One such console 601 is shown in FIG. 33. As only one position can be selected for such consoles, the chosen position is likely uncomfortable to operate and/or inhibits free movement of operators around the work platform in order to avoid increasing the overall height of the fire apparatus. The control console 600 solves this problem by being reconfigurable depending upon the situation. In many situations, such as during transit or when loading operators onto the work platform 550, it is not necessary to have active control over the aerial assembly 500. In such situations, the interface section 610 of the control console 600 can be moved to the stowed position. In the stowed position, the interface section 610 is moved away from the work platform 550 and out of the access opening 660 and the access opening 662, facilitating uninhibited movement to and across the work platform 550. Additionally, because the axis of extension 654 is angled relative to a horizontal plane, the interface section 610 is lowered relative to the operating position to prevent the control console 600 from increasing the overall height H of the fire apparatus 10. During operation of the aerial assembly 500, the overall height of the fire apparatus 10 becomes less critical. Additionally, the operators may be loaded onto the work platform 550 and/or the aerial ladder assembly 700 prior to operating the aerial assembly 500, so obstructing the platform access path is largely inconsequential. However, providing the operator interface 615 in a position that is easy and comfortable to access becomes much more critical. When in the use position, the interface section 610 is moved toward the work platform 550 and upward to facilitate an operator standing on the work platform 550 comfortably accessing the operator interface 615.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire apparatus 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A vehicle comprising:
- a chassis;
- a plurality of tractive assemblies coupled to the chassis;
- a body assembly coupled to the chassis;
- a turntable rotatably coupled to the chassis;
- a platform coupled to the turntable and configured to support an operator in a command position, the platform including an outer perimeter; and
- a control console, comprising:
  - a base section coupled to the turntable and spaced from the outer perimeter of the platform;
  - a movable section that is movably coupled to the base section, the movable section including an operator interface configured to receive commands from the operator to control one or more systems of the vehicle,
- wherein the movable section of the control console is selectively repositionable relative to the base section between a stowed position and an operating position, and wherein the operator interface is configured to be accessible by the operator from the command position when the movable section is in the operating position, and
- wherein the vehicle has an overall height defining a top plane, the movable section of the control console further configured to be below the top plane when in the stowed position.

2. The vehicle of claim 1, further comprising a step coupled to at least one of the turntable or the chassis and extending between the outer perimeter and the base section of the control console, wherein a top surface of the step is positioned lower than a top surface of the platform.

3. The vehicle of claim 1, the control console further comprising a repositioning mechanism configured to facilitate selective repositioning of the movable section relative to the base section.

4. The vehicle of claim 3, wherein the repositioning mechanism is a guide mechanism including a plurality of bearings, the guide mechanism configured to facilitate translation of the movable section along an axis.

5. The vehicle of claim 3, wherein the repositioning mechanism is a hinge mechanism including an axis, the hinge mechanism configured to facilitate rotation of the movable section about the axis.

6. The vehicle of claim 1, wherein the movable section extends a first distance from the outer perimeter of the platform in the stowed position, wherein the movable section extends a second distance from the outer perimeter of the platform in the operating position, and wherein the second distance is less than the first distance.

7. The vehicle of claim 1, wherein the movable section of the control console is horizontally offset from the platform such that the movable section of the control console does not extend directly above the platform when in the stowed position, and wherein the movable section extends closer to the platform when in the operating position than when in the stowed position.

8. A fire apparatus comprising:
- a chassis;
- a plurality of axles coupled to the chassis;
- an aerial assembly, comprising:
  - a turntable rotatably coupled to the chassis;
  - an aerial ladder assembly rotatably coupled to the turntable and having a distal end opposite the turntable;
  - a platform coupled to the turntable and configured to support an operator, in a command position, the platform including an outer perimeter; and
- a control console, comprising:
  - a base section coupled to the turntable and spaced from the outer perimeter of the platform; and
  - an interface section movably coupled to the base section and selectively repositionable between a stowed position and an operating position, wherein the interface section is configured to receive commands to control rotation of the aerial ladder assembly and the turntable,
- wherein the interface section is configured to be accessible by the operator from the command position when the interface section is in the operating position,
- wherein the fire apparatus has an overall height defining a top plane, the interface section of the control console further configured to be below the top plane when in the stowed position.

9. The fire apparatus of claim 8, wherein the outer perimeter of the platform includes a railing coupled to the platform and extending above the platform.

10. The fire apparatus of claim 8, further comprising a step coupled to at least one of the turntable or the chassis and extending between the outer perimeter of the platform and the base section of the control console, wherein a top surface of the step is positioned lower than a top surface of the platform.

11. The fire apparatus of claim 8, the control console further comprising a repositioning mechanism configured to facilitate selective repositioning of the interface section relative to the base section.

12. The fire apparatus of claim 11, wherein the repositioning mechanism is a guide mechanism including a plurality of bearings, the guide mechanism configured to facilitate translation of the interface section along an axis.

13. The fire apparatus of claim 11, wherein the repositioning mechanism is a hinge mechanism including an axis, the hinge mechanism configured to facilitate rotation of the interface section about the axis.

14. The fire apparatus of claim 8, further comprising a side ladder coupled to the chassis, the side ladder including a series of steps, wherein the side ladder is aligned with an access opening in at least one orientation of the turntable.

15. The fire apparatus of claim 8, wherein the turntable includes a base and a pair of supports extending upward from the base, wherein the aerial ladder assembly is received between the supports, and wherein the platform and the control console both extend laterally outward of the same support.

16. An aerial assembly for a fire apparatus, comprising:

a turntable configured to be rotatably coupled to a chassis of the fire apparatus;

a platform coupled to the turntable and configured to support an operator in a command position, the platform including a top surface and an outer perimeter;

an aerial ladder assembly pivotably coupled to the turntable; and a control console comprising:

a base section coupled to the turntable and spaced from the outer perimeter of the platform; and a movable section movably coupled to the base section, the movable section including an operator interface configured to receive commands from the operator, wherein the movable section is selectively repositionable relative to the base section between a stowed position and an operating position, wherein the operator interface is configured to be accessible by the operator from the command position when the movable section is in the operating position, wherein the aerial assembly includes a top plane, wherein the movable section of the control console is further configured to be below the top plane when in the stowed position.

17. The aerial assembly of claim 16, further comprising a step extending between the outer perimeter of the platform and the base section of the control console, wherein a top surface of the step is positioned lower than the top surface of the platform.

18. The aerial assembly of claim 16, the control console further comprising a repositioning mechanism configured to facilitate selective repositioning of the movable section relative to the base section.

19. The aerial assembly of claim 18, wherein the repositioning mechanism is a guide mechanism including a plurality of bearings, the guide mechanism configured to facilitate translation of the movable section along an axis.

20. The aerial assembly of claim 18, wherein the repositioning mechanism is a hinge mechanism including an axis, the hinge mechanism configured to facilitate rotation of the movable section about the axis.

* * * * *